United States Patent
Khoshnevisan et al.

(10) Patent No.: US 12,069,686 B2
(45) Date of Patent: *Aug. 20, 2024

(54) BLIND DECODING LIMITS AND OVERBOOKING FOR PHYSICAL DOWNLINK CONTROL CHANNEL REPETITION

(71) Applicant: QUALCOMM Incorporated, San Diego, CA (US)

(72) Inventors: Mostafa Khoshnevisan, San Diego, CA (US); Jing Sun, San Diego, CA (US); Xiaoxia Zhang, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 48 days.

This patent is subject to a terminal disclaimer.

(21) Appl. No.: 17/573,250

(22) Filed: Jan. 11, 2022

(65) Prior Publication Data

US 2022/0225301 A1     Jul. 14, 2022

Related U.S. Application Data

(60) Provisional application No. 63/136,295, filed on Jan. 12, 2021.

(51) Int. Cl.
*H04W 72/23* (2023.01)

(52) U.S. Cl.
CPC .................................. *H04W 72/23* (2023.01)

(58) Field of Classification Search
CPC .................................................. H04W 72/23
See application file for complete search history.

(56) References Cited

U.S. PATENT DOCUMENTS 10,631,280 B2 *  4/2020  Baldemair ........ H04W 74/0833
11,711,832 B2 *  7/2023  Khoshnevisan .. H04W 72/0466
(Continued)

FOREIGN PATENT DOCUMENTS

| EP | 3982573 A1 | 4/2022 |
| WO | WO-2020064512 A1 | 4/2020 |
| WO | WO-2022066900 A1 | 3/2022 |

OTHER PUBLICATIONS

Huawei: "Summary of Monday Offline Discussion on PDCCH Enhancements", 3GPP Draft, 3GPP TSG RAN WG1 Meeting #97, R1-1907763, 3rd Generation Partnership Project (3GPP), Mobile Competence Centre, 650, Route Des Lucioles, F-06921 Sophia-Antipolis Cedex, France, vol. RAN WG1, No. Reno, USA, May 13, 2019-May 17, 2019, May 16, 2019 (May 16, 2019), pp. 1-60, XP051740036, Retrieved from the Internet: URL: http://www.3gpp.org/ftp/tsg%5Fran/WG1%5FRL1/TSGR1%5F97/Docs/R1%2D1907763%2Ezip [Retrieved on May 16, 2019] Sections 1-4 Appendix.

(Continued)

*Primary Examiner* — Ronald B Abelson
(74) *Attorney, Agent, or Firm* — Holland & Hart LLP

(57) ABSTRACT

Methods, systems, and devices for wireless communications are described. Generally, individual physical downlink control channel (PDCCH) candidates of a first search space (SS) set in a first transmission time interval (TTI) may be linked to corresponding PDCCH candidates of a second SS set in a second TTI. The UE may count combinations of the PDCCH candidates in the first TTI and the PDCCH candidates in the second TTI toward a blind decoding (BD) limit of only the second TTI, or the BD limit of the first TTI and the BD limit of the second TTI. The first SS set and second SS set may be in the same TTI. The UE may consider, with respect to a BD limit, a first set of PDCCH candidates, a second set of PDCCH candidates, and a combination of the (Continued)

first and second set of PDCCH candidates, together, or separately, or any combination thereof.

44 Claims, 11 Drawing Sheets

(56) References Cited

U.S. PATENT DOCUMENTS

| | | | |
|---|---|---|---|
| 2020/0154412 A1* | 5/2020 | Lee | H04L 5/001 |
| 2022/0116981 A1* | 4/2022 | Saber | H04L 1/1896 |
| 2023/0254716 A1* | 8/2023 | Khoshnevisan | H04W 72/0446 |

OTHER PUBLICATIONS

International Search Report and Written Opinion—PCT/US2022/012165—ISA/EPO—May 4, 2022.
Moderator (Qualcomm): "Summary of Email Discussions [103-e-NR-feMIM0-02] for mTRP PDCCH Enhancements", 3GPP Draft, 3GPP TSG-RAN WG1 Meeting #103-e, R1-2009683, 3rd Generation Partnership Project (3GPP), Mobile Competence Centre, 650, Route Des Lucioles, F-06921 Sophia-Antipolis Cedex, France, vol. RAN WG1, No. e-Meeting, Oct. 26, 2020-Nov. 13, 2020, Nov. 11, 2020 (Nov. 11, 2020), XP051953514, 73 Pages, Retrieved from the Internet: URL: https://ftp.3gpp.org/tsg_ran/WG1_RL1/TSGR1_103-e/Docs/R1-2009683.zip R1-2009683 Summary of email Discussions [103-e-NR-feMIM0-02] for mTRP PDCCH Enhancements. docx [Retrieved on Nov. 11, 2020] sections 1-5.

* cited by examiner

BLIND DECODING LIMITS AND OVERBOOKING FOR PHYSICAL DOWNLINK CONTROL CHANNEL REPETITION

CROSS REFERENCE

The present application for patent claims the benefit of U.S. Provisional Patent Application No. 63/136,295 by KHOSHNEVISAN et al., entitled "BLIND DECODING LIMITS AND OVERBOOKING FOR PHYSICAL DOWNLINK CONTROL CHANNEL REPETITION," filed Jan. 12, 2021, assigned to the assignee hereof, and expressly incorporated by reference herein.

FIELD OF TECHNOLOGY

The following relates to wireless communications, including blind decoding limits and overbooking for physical downlink control channel repetition.

TECHNICAL FIELD

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE). In some examples, a UE may support physical downlink control channel (PDCCH) repetition.

SUMMARY

The described techniques relate to improved methods, systems, devices, and apparatuses that support blind decoding (BD) limits and overbooking for physical downlink control channel (PDCCH) repetition. Generally, a user equipment (UE) may receive a configuration message indicating that individual PDCCH candidates of a first search space (SS) set in a first transmission time interval (TTI) (e.g., a slot or a span) are linked to corresponding PDCCH candidates of a second SS set in a second TTI. The UE may be limited with respect to a total number of PDCCH candidates it is permitted to monitor in a given TTI (e.g., a BD limit). The UE may count PDCCH candidates in the first SS set toward a BD limit of the first TTI, and may count PDCCH candidates in the second SS toward a BD limit of the second TTI. The UE may count combinations of the PDCCH candidates in the first TTI and the PDCCH candidates in the second TTI toward the BD limit of only the second TTI, or may count the combinations of the PDDCH candidates in the first and second TTIs toward both the BD limit of the first TTI and the BD limit of the second TTI (e.g., may count PDCCH candidates in the first SS set toward the BD limit of the first TTI two times, or may count PDCCH candidates in the second SS toward the BD limit of the second TTI two times, or both). Additionally, the UE may consider the combinations of PDCCH candidates together with or separate from other PDCCH candidates in a TTI for purposes of overbooking procedures.

In some examples, techniques described herein may also describe how a UE may be configured with a first SS set and a second SS set in the same TTI. In such examples, the UE may consider a first set of PDCCH candidates of the first SS set, a second set of PDCCH candidates of the second SS set, and a combination of the first set of PDCCH candidates and the second set of PDCCH candidates, all together, or all separately, or any combination thereof (e.g., the combination of the first set of PDCCH candidates may be grouped with only one of the first set of PDCCH candidates and the second set of PDCCH candidates with respect to an overbooking procedure).

A method for wireless communications at a UE is described. The method may include receiving, from a base station, a configuration message that indicates that individual ones of a first group of downlink control channel candidates in a first SS set of a first TTI are associated with corresponding ones of a second group of downlink control channel candidates in a second SS set of a second TTI which is after the first TTI, determining a total number of downlink control channel candidates associated with the second SS set to be counted towards a BD limit of the second TTI by counting each downlink control channel candidate of the second group of downlink control channel candidates two times.

An apparatus for wireless communications at a UE is described. The apparatus may include at least one processor, memory coupled (e.g., operatively, communicatively, functionally, electronically, or electrically) to the at least one processor, the memory storing instructions that may be executable by the at least one processor to cause the apparatus to receive, from a base station, a configuration message that indicates that individual ones of a first group of downlink control channel candidates in a first SS set of a first TTI are associated with corresponding ones of a second group of downlink control channel candidates in a second SS set of a second TTI which is after the first TTI, determine a total number of downlink control channel candidates associated with the second SS set to be counted towards a BD limit of the second TTI by counting each downlink control channel candidate of the second group of downlink control channel candidates two times.

Another apparatus for wireless communications at a UE is described. The apparatus may include means for receiving, from a base station, a configuration message that indicates that individual ones of a first group of downlink control channel candidates in a first SS set of a first TTI are associated with corresponding ones of a second group of downlink control channel candidates in a second SS set of a second TTI which is after the first TTI, means for determining a total number of downlink control channel candidates associated with the second SS set to be counted towards a BD limit of the second TTI by counting each downlink control channel candidate of the second group of downlink control channel candidates two times.

A non-transitory computer-readable medium storing code for wireless communications at a UE is described. The code may include instructions executable by a processor to receive, from a base station, a configuration message that indicates that individual ones of a first group of downlink control channel candidates in a first SS set of a first TTI are associated with corresponding ones of a second group of downlink control channel candidates in a second SS set of a second TTI which is after the first TTI, determine a total number of downlink control channel candidates associated with the second SS set to be counted towards a BD limit of the second TTI by counting each downlink control channel candidate of the second group of downlink control channel candidates two times.

Some examples of the method, apparatuses, and non-transitory computer-readable medium described herein may further include operations, features, means, or instructions for determining that an overbooking condition associated with overbooking of downlink control channel candidates within the second TTI exists and evaluating the overbooking condition based on respective numbers of the second group of downlink control channel candidates and each combination of individual ones of the first group of downlink control channel candidates with corresponding ones of the second group of downlink control channel candidates, where the monitoring for downlink control channel transmissions may be further based on the evaluation of the overbooking condition.

In some examples of the method, apparatuses, and non-transitory computer-readable medium described herein, evaluating the overbooking condition may include operations, features, means, or instructions for determining whether the overbooking condition may be satisfied by evaluating the total number of downlink control channel candidates associated with the second SS set together.

In some examples of the method, apparatuses, and non-transitory computer-readable medium described herein, evaluating the overbooking condition may include operations, features, means, or instructions for determining whether the overbooking condition may be satisfied by evaluating the second group of downlink control channel candidates separate from the combinations of individual ones of the first group of downlink control channel candidates with corresponding ones of the second group of downlink control channel candidates.

Some examples of the method, apparatuses, and non-transitory computer-readable medium described herein may further include operations, features, means, or instructions for determining to count the first group of downlink control channel candidates, the second group of downlink control channel candidates, and a third group of downlink control channel candidates towards a BD limit per TTI based on the configuration message, wherein the third group of downlink control channel candidates comprises a combination of individual ones of the first group of downlink control channel candidates with corresponding ones of the second group of downlink control channel candidates, and monitoring for downlink control channel transmissions during the second TTI based on the counting of the BD limit of the second TTI, counting the second group of downlink control channel candidates and the third group of downlink control channel candidates towards the BD limit of the second TTI, and monitoring for downlink control channel transmissions during the second TTI based on the counting towards the BD limit of the second TTI.

Some examples of the method, apparatuses, and non-transitory computer-readable medium described herein may further include operations, features, means, or instructions for determining that an overbooking condition associated with overbooking of downlink control channel candidates within the first TTI exists and evaluating the overbooking condition based on respective numbers of the first group of downlink control channel candidates and each combination of individual ones of the first group of downlink control channel candidates with corresponding ones of the second group of downlink control channel candidates, where the monitoring for downlink control channel transmissions may be further based on the evaluation of the overbooking condition.

In some examples of the method, apparatuses, and non-transitory computer-readable medium described herein, evaluating the overbooking condition may include operations, features, means, or instructions for determining whether the overbooking condition may be satisfied by evaluating the total number of downlink control channel candidates associated with the first SS set together.

In some examples of the method, apparatuses, and non-transitory computer-readable medium described herein, evaluating the overbooking condition may include operations, features, means, or instructions for determining whether the overbooking condition may be satisfied by evaluating the first group of downlink control channel candidates separate from the combinations of individual ones of the first group of downlink control channel candidates with corresponding ones of the second group of downlink control channel candidates.

In some examples of the method, apparatuses, and non-transitory computer-readable medium described herein, the second TTI includes one of a time slot or a time span, and the first TTI includes one of a time slot or a time span.

Some examples of the method, apparatuses, and non-transitory computer-readable medium described herein may further include operations, features, means, or instructions for receiving, from the base station, an instruction to count, towards the BD limit of the second TTI, a combination of individual ones of the first group of downlink control channel candidates with corresponding ones of the second group of downlink control channel candidates separately from a number of downlink control channel candidates in the second group of downlink control channel candidates, where determining the total number of downlink control channel candidates associated with the second SS set may be based on the instruction.

In some examples of the method, apparatuses, and non-transitory computer-readable medium described herein, the other downlink control channel candidates associated with the second TTI correspond to a third SS set, or a UE-specific SS, or a common SS.

A method for wireless communications at a UE is described. The method may include receiving, from a base station, a configuration message that indicates that individual ones of a first group of downlink control channel candidates in a first SS set of a TTI are associated with corresponding ones of a second group of downlink control channel candidates in a second SS set of the TTI, determining that an overbooking condition associated with overbooking of downlink control channel candidates within the TTI exists, evaluating the overbooking condition based on respective numbers of the first group of downlink control channel candidates and the second group of downlink control channel candidates, and monitoring for downlink control channel transmissions during the TTI based on the evaluation of the overbooking condition.

An apparatus for wireless communications at a UE is described. The apparatus may include at least one processor, memory coupled (e.g., operatively, communicatively, functionally, electronically, or electrically) to the at least one processor, the memory storing instructions that may be executable by the at least one processor to cause the apparatus to receive, from a base station, a configuration message that indicates that individual ones of a first group of downlink control channel candidates in a first SS set of a TTI are associated with corresponding ones of a second group of downlink control channel candidates in a second SS set of the TTI, determine that an overbooking condition associated with overbooking of downlink control channel candidates within the TTI exists, evaluate the overbooking condition based on respective numbers of the first group of downlink control channel candidates and the second group of downlink control channel candidates, and monitor for downlink control channel transmissions during the TTI based on the evaluation of the overbooking condition.

Another apparatus for wireless communications at a UE is described. The apparatus may include means for receiving, from a base station, a configuration message that indicates that individual ones of a first group of downlink control channel candidates in a first SS set of a TTI are associated with corresponding ones of a second group of downlink control channel candidates in a second SS set of the TTI, means for determining that an overbooking condition associated with overbooking of downlink control channel candidates within the TTI exists, means for evaluating the overbooking condition based on respective numbers of the first group of downlink control channel candidates and the second group of downlink control channel candidates, and means for monitoring for downlink control channel transmissions during the TTI based on the evaluation of the overbooking condition.

A non-transitory computer-readable medium storing code for wireless communications at a UE is described. The code may include instructions executable by a processor to receive, from a base station, a configuration message that indicates that individual ones of a first group of downlink control channel candidates in a first SS set of a TTI are associated with corresponding ones of a second group of downlink control channel candidates in a second SS set of the TTI, determine that an overbooking condition associated with overbooking of downlink control channel candidates within the TTI exists, evaluate the overbooking condition based on respective numbers of the first group of downlink control channel candidates and the second group of downlink control channel candidates, and monitor for downlink control channel transmissions during the TTI based on the evaluation of the overbooking condition.

In some examples of the method, apparatuses, and non-transitory computer-readable medium described herein, evaluating the overbooking condition may include operations, features, means, or instructions for determining whether the overbooking condition may be satisfied by evaluating the number of the first group of downlink control channel candidates or the second group of downlink control channel candidates, and a third group of downlink control channel candidates, wherein the third group comprises a combination of individual ones of the first group of downlink control channel candidates with corresponding ones of the second group of downlink control channel candidates.

Some examples of the method, apparatuses, and non-transitory computer-readable medium described herein may further include operations, features, means, or instructions for comparing a first index value associated with the first SS set with a second index value associated with the second SS set and determining whether the overbooking condition may be satisfied by counting each downlink control channel candidate of the second group of downlink control channel candidates two times based on determining that the second index value associated with the second SS set is greater than the first index value associated with the first SS set.

In some examples of the method, apparatuses, and non-transitory computer-readable medium described herein, evaluating the overbooking condition may include operations, features, means, or instructions for determining whether the overbooking condition may be satisfied by evaluating the number of the first group of downlink control channel candidates, and each combination of individual ones of the first group of downlink control channel candidates with corresponding ones of the second group of downlink control channel candidates, together.

Some examples of the method, apparatuses, and non-transitory computer-readable medium described herein may further include operations, features, means, or instructions for comparing a last monitoring occasion of the first SS set with a last monitoring occasion of the second SS set, determining that the last monitoring occasion of the first SS set may be later in time than the last monitoring occasion of the second SS set, and determining whether to monitor the number of the first group of downlink control channel candidates, and each combination of individual ones of the first group of downlink control channel candidates with corresponding ones of the second group of downlink control channel candidates, based on determining that the last monitoring occasion of the first SS set may be later in time than the last monitoring occasion of the second SS set.

Some examples of the method, apparatuses, and non-transitory computer-readable medium described herein may further include operations, features, means, or instructions for comparing a first index value associated with the first SS set with a second index value associated with the second SS set and determining to monitor the number of the second group of downlink control channel candidates and the third group of downlink control channel candidates together based on determining that the second index value associated with the second SS set is greater than the first index value associated with the first SS set.

Some examples of the method, apparatuses, and non-transitory computer-readable medium described herein may further include operations, features, means, or instructions for comparing a first index value of a first control resource set associated with the first SS set with a second index of a second control resource set associated with the second SS set and determining whether to the number of the first group of downlink control channel candidates, and each combination of individual ones of the first group of downlink control channel candidates with corresponding ones of the second group of downlink control channel candidates based on the comparing.

In some examples of the method, apparatuses, and non-transitory computer-readable medium described herein, evaluating the overbooking condition may include operations, features, means, or instructions for determining whether the overbooking condition may be satisfied by evaluating the first group of downlink control channel candidates, the second group of downlink control channel candidates, and the combinations of individual ones of the first group of downlink control channel candidates with corresponding ones of the second group of downlink control channel candidates, separate from each other.

In some examples of the method, apparatuses, and non-transitory computer-readable medium described herein, the TTI includes one of a time slot or a time span.

DETAILED DESCRIPTION

Figure 1:
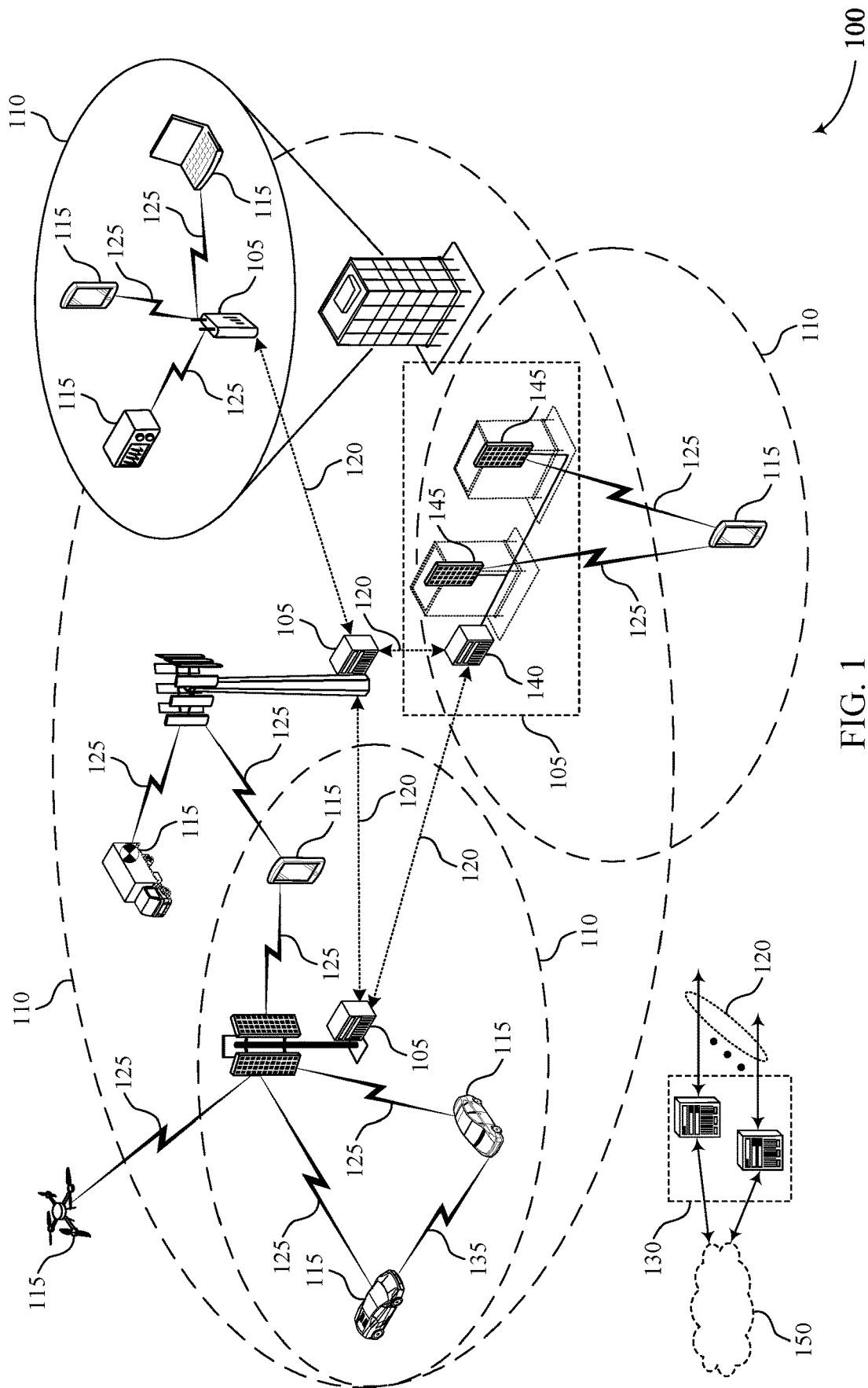
FIG. 1 illustrates an example of a wireless communications system that supports blind decoding (BD) limits and overbooking for physical downlink control channel (PDCCH) repetition in accordance with aspects of the present disclosure.

Some wireless communications systems may support physical downlink control channel (PDCCH) monitoring and PDCCH repetition. In some examples, a number of PDCCH candidates that may be monitored within a slot or span may be limited by a blind decoding (BD) limit. Nevertheless, in some cases, overbooking (e.g., configuring a number of PDCCH candidates that exceed the BD limit for a transmission time interval (TTI)) may be permitted. A user equipment (UE) that has been overbooked may identify configured PDCCH candidates and determine whether or not to monitor configured PDDCH candidates based on one or more rules.

Additionally, a UE may be configured with PDCCH repetition. In such cases, a base station may transmit control information multiple times across multiple repetitions. In terms of PDCCH repetition, PDCCH candidates of a first search space (SS) set may be linked with PDCCH candidates of a second SS set. A UE may perform soft combining procedures by combining control signaling received in a first PDCCH candidate in a first SS set with control signaling received in a second SS set. Thus, the UE may monitor a first set of PDDCH candidates (e.g., of the first SS set), a second set of PDCCH candidates (e.g., of the second SS set), and a third set of PDCCH candidates (e.g., by combining the first set of PDCCH candidates with the second set of PDCCH candidates). In such examples, a UE may need to determine how to count the third set of PDCCH candidates with reference to the BD limits, and may also determine how to perform overbooking procedures based on the counting.

A UE may be configured to count two linked PDCCH candidates for repetition as three monitored PDCCH candidates toward a BD limit per TTI (e.g., slot or span). For cases where monitoring occasions for two linked SS sets are located in different TTIs, a UE may count the third set of PDCCH candidates (the combined PDCCH candidates consisting of first and second repetitions) towards the BD limit of both TTIs. Or, in some examples, the UE may only count the third set of PDCCH candidates toward the BD limit of one TTI (e.g., the second or later TTI). The UE may then consider overbooking procedures for the two TTIs. For instance, the individual PDCCH candidates associated with the second TTI may be counted together with the combination PDCCH candidates, and the UE may determine whether to monitor or drop all of the second set of PDCCH candidates and the third set of PDCCH candidates.

In cases where the monitoring occasions of the linked SS sets are located within a single TTI, the UE may count the combined repetitions (e.g., the third set of PDCCH candidates) against the BD limit of that TTI (e.g., the UE may count the first set of PDCCH candidates two times toward the BD limit of the TTI, or the second set of PDCCH candidates two times toward the limit of the TTI, or both). In such cases, the UE may evaluate overbooking conditions for each set of PDCCH candidates separately, or in various combinations. For instance, the UE may evaluate (e.g., determine to monitor or drop) all of the first set of PDCCH candidates, the second set of PDCCH candidates, and the third set of PDCCH candidates, together. Or, the UE may evaluate (e.g., determine whether to monitor or drop) each set of PDCCH candidates separately. Or, the UE may evaluate (e.g., determine whether to monitor or drop) one set of PDCCH candidates (e.g., the first set of PDCCH candidates) separately, and may evaluate the second and third sets of PDCCH candidates (e.g., the second set of PDCCH candidates and the combinations of the first and second sets of PDCCH candidates) together.

Techniques described herein may be implemented to realize one or more advantages. For example, described techniques may result in increased system efficiency, more efficient utilization of available resources, more efficient use of UE computational resources, or the like.

Aspects of the disclosure are initially described in the context of wireless communications systems. Aspects of the disclosure are further illustrated by and described with reference to wireless communications systems and monitoring schemes. Aspects of the disclosure are further illustrated by and described with reference to apparatus diagrams, system diagrams, and flowcharts that relate to BD limits and overbooking for PDCCH repetition.

FIG. 1 illustrates an example of a wireless communications system 100 that supports BD limits and overbooking for PDCCH repetition in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a multimedia/entertainment device (e.g., a radio, a MP3 player, or a video device), a camera, a gaming device, a navigation/positioning device (e.g., GNSS (global navigation satellite system) devices based on, for example, GPS (global positioning system), Beidou, GLONASS, or Galileo, or a terrestrial-based device), a tablet computer, a laptop computer, a personal computer, a netbook, a smartbook, a personal computer, a smart device, a wearable device (e.g., a smart watch, smart clothing, smart glasses, virtual reality goggles, a smart wristband, smart jewelry (e.g., a smart ring, a smart bracelet)), a drone, a robot/robotic device, a vehicle, a vehicular device, a meter (e.g., parking meter, electric meter, gas meter, water meter), a monitor, a gas pump, an appliance (e.g., kitchen appliance, washing machine, dryer), a location tag, a medical/healthcare device, an implant, a sensor/actuator, a display, or any other suitable device configured to communicate via a wireless or wired medium. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a TTI. In some examples, the TTI duration (e.g., the number of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more SS sets, and each SS set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. SS sets may include common SS sets configured for sending control information to multiple UEs 115 and UE-specific SS sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging. In an aspect, techniques disclosed herein may be applicable to MTC or IoT UEs. MTC or IoT UEs may include MTC/enhanced MTC (eMTC, also referred to as CAT-M, Cat M1) UEs, NB-IoT (also referred to as CAT NB1) UEs, as well as other types of UEs. eMTC and NB-IoT may refer to future technologies that may evolve from or may be based on these technologies. For example, eMTC may include FeMTC (further eMTC), eFeMTC (enhanced further eMTC), and mMTC (massive MTC), and NB-IoT may include eNB-IoT (enhanced NB-IoT), and FeNB-IoT (further enhanced NB-IoT).

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

Generally, a UE 115 may receive a configuration message from a base station indicating that individual PDCCH candidates of a first SS set in a first TTI (e.g., a slot or a span) are linked to corresponding PDCCH candidates of a second SS set in a second TTI. The UE 115 may be limited with respect to a total number of PDCCH candidates it is permitted to monitor in a given TTI (e.g., a BD limit). The UE 115 may count PDCCH candidates in the first SS set toward a BD limit of the first TTI, and may count PDCCH candidates in the second SS toward a BD limit of the second TTI. The UE 115 may count combinations of the PDCCH candidates in the first TTI and the PDCCH candidates in the second TTI toward the BD limit of only the second TTI, or may count the combinations of the PDDCH candidates in the first and second TTIs toward both the BD limit of the first TTI and the BD limit of the second TTI. Additionally, the UE 115 may consider the combinations of PDCCH candidates together with or separate from other PDCCH candidates in a TTI for purposes of overbooking procedures.

In some examples, techniques described herein may also describe how a UE may be configured with a first SS set and a second SS set in the same TTI. In such examples, the UE 115 may consider a first set of PDCCH candidates of the first SS set, a second set of PDCCH candidates of the second SS set, and a combination of the first set of PDCCH candidates and the second set of PDCCH candidates, all together, or all separately, or any combination thereof (e.g., the combination of the first set of PDCCH candidates may be grouped with only one of the first set of PDCCH candidates and the second set of PDCCH candidates with respect to an overbooking procedure).

Figure 2:
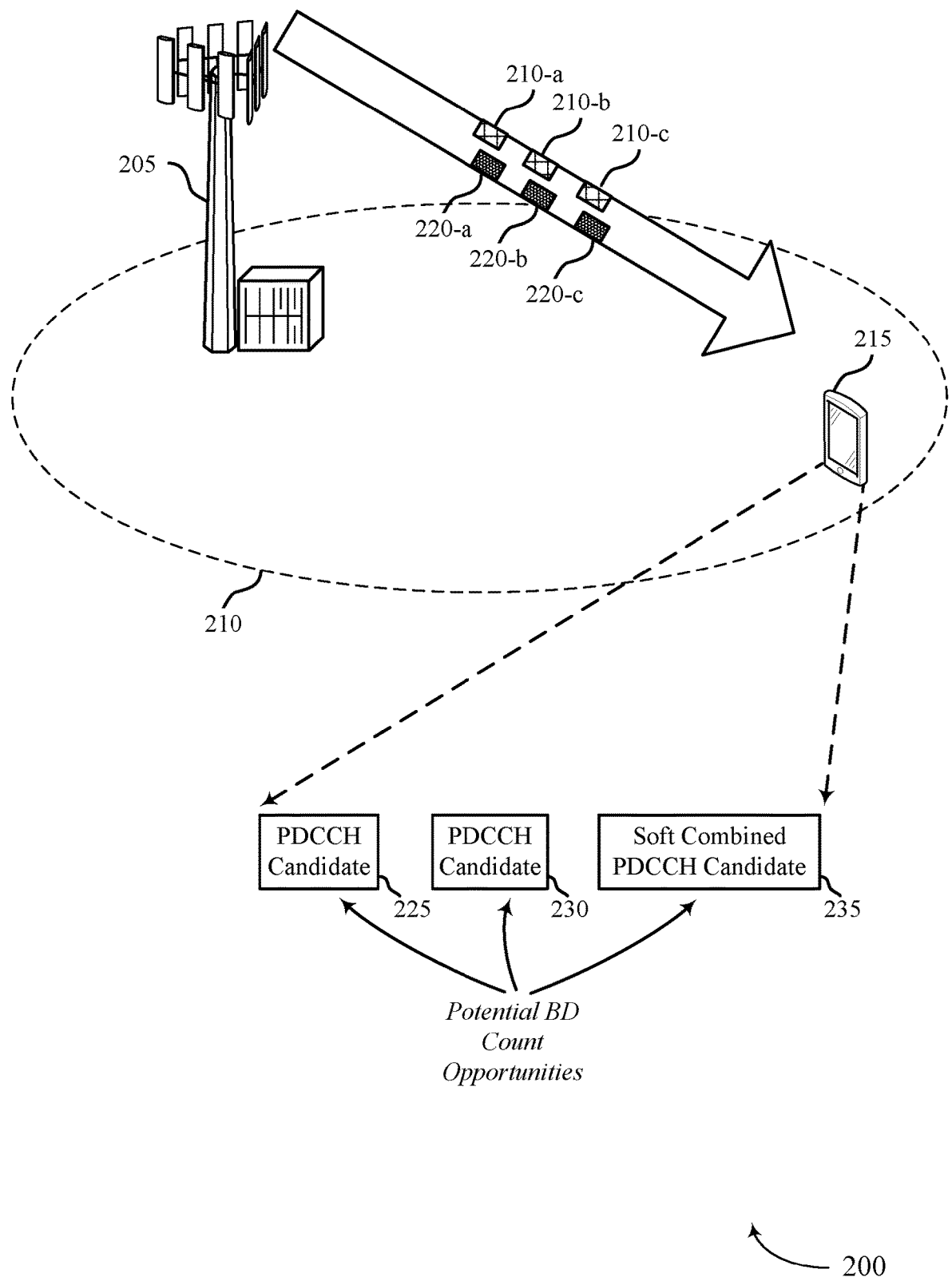
FIG. 2 illustrates an example of a wireless communications system that supports BD limits and overbooking for PDCCH repetition in accordance with aspects of the present disclosure.

FIG. 2 illustrates an example of a wireless communications system 200 that supports BD limits and overbooking for PDCCH repetition in accordance with aspects of the present disclosure. Wireless communications system 200 may include a base station 205, and a UE 215, which may be examples of corresponding devices described with reference to FIG. 1. In some aspects, base station 205 may be a serving base station or a cell of UE 215 and may support repetition-based PDCCH candidates configured for UE 215.

In some aspects, UE 215 may be configured with one or more CORESETs in a BWP of a serving cell. For example, UE 215 may be configured with three, five, or some other number of CORESETs in a BWP configured by base station 205. Generally, each CORESET may be associated with one active transmission configuration indicator (TCI) state. For example, as part of the configuration of the CORESET for UE 215 by base station 205, the number of resource blocks (RBs) of the CORESET in the frequency domain and the number of symbols of the CORESET in the time domain (e.g., one, two, or three OFDM symbols) may be RRC configured for UE 215.

In some examples, wireless communications system 200 may support PDCCH monitoring in one or more search space (SS) sets. In some aspects, each SS set may be associated with one CORESET. There may be, for instance, up to ten SS sets in a BWP of a component carrier (CC). As part of the SS set configuration, RRC signaling may be used to configure the associated CORESET, the periodicity and offset of the monitored slots and the symbols to be monitored within the slot in the time domain, or the DCI formats to be monitored, the number of PDCCH candidates for a given aggregation level (AL). The PDCCH candidates may be defined as part of a SS set configuration. For example, the PDCCH candidate with a given AL in a given PDCCH candidate index may be defined in a given SS set. A DCI may be conveyed in one PDCCH candidate. For example, base station 205 may configure a first SS set including multiple PDCCH monitoring occasions 210 (e.g., monitoring occasion 210-a, monitoring occasion 210-b, and monitoring occasion 210-c), and a second SS set including multiple PDCCH monitoring occasions 220 (e.g., monitoring occasion 220-a, monitoring occasion 220-b, and monitoring occasion 220-c). Each monitoring occasion may be configured with one or more PDCCH candidates (e.g., PDCCH candidates 225 included in a monitoring occasion 210, PDCCH candidates 230 included in a monitoring occasion 220, or the like).

UE 215 may monitor PDCCH candidates in various SS sets to receive one or more DCI messages. UE 215 may determine that PDCCH candidates have passed a cyclic redundancy check (CRC) check (e.g., UE 215 may attempt to blindly decode each PDCCH candidate, with a BD attempt where the PDCCH candidate passes the CRC check corresponding to a successfully decoded DCI).

In some wireless communication systems there may be a limit (e.g., a maximum number) of monitored PDCCH candidates that UE 215 can attempt to blindly decode (e.g., a blind decode limit, which may be also referred to as a maximum blind decode count, a BD limit, a monitored PDCCH candidate limit, or the like). The blind decode limit (BD limit) may be based on a given TTI (e.g., a slot, span, or other duration in the time domain). For example, for four configured downlink serving cells or smaller, a separate BD limit may be supported per downlink serving cell according to the basic unit of the limit for one CC. The BD limit for four downlink serving cells or smaller may be fixed, and may depend on a subcarrier spacing (SCS) of the slot per serving cell. For instance, the maximum number of monitored PDCCH candidates per slot or downlink BWP with different SCS configurations for a single serving cell may range from 20-44, depending on the SCS configuration. In some examples, the maximum number of non-overlapped CCEs per TTI in a downlink BWP with different SCS configurations for a single serving cell may range from 32-56, depending on the SCS configuration and other factors. For more than four downlink serving cells, UE 215 may indicate, to base station 205, its total capacity (e.g., via a PDCCH-BlindDetectionCA parameter value that is an integer larger than or equal to four). The total limit may be defined across downlink serving cells with the same SCS based on the indicated capacity, a number of downlink CCs with the same SCS, and a total number of CCs. The BD limit may be per scheduled cell limit, and may be defined as a minimum of a total limit, and a basic unit of the limits indicated with reference to the SCS (e.g., 20-44, or 32-56, or the like).

Thus, in any given TTI, a UE may be configured with one or more PDCCH candidates. The PDCCH candidates may correspond to different SSSs. The UE may count some or all of the PDCCH candidates toward the BD limit.

Some wireless communication systems may enable a PDCCH transmission with two active TCI states. Variations of this approach may include one CORESET with two active TCI states, one SS set associated with two different CORESETS, or two SS sets associated with corresponding CORESETs. In the situation where one CORESET is associated with two active TCI states, base station 205 may configure one PDCCH candidate (in a given SS set) to be associated with both TCI states of the CORESET. In another approach where one CORESET may be associated with two active TCI states, base station 205 may configure two sets of PDCCH candidates (in a given SS set) to be associated with the two active TCI states of the CORESET, respectively. In yet another approach where one CORESET may be associated with two active TCI states, base station 205 may configure two sets of PDCCH candidates to be associated with two corresponding SS sets, where both SS sets are associated with the CORESET and each SS set is associated with only one TCI state of the CORESET. Generally, a set of PDCCH candidates may include a single or multiple PDCCH candidates, and the PDCCH candidate in a set corresponds to a repetition or chance in which the DCI may be indicated to UE 215.

Sets of PDCCH candidates in various SS sets may provide repetition-based PDCCH candidates where each PDCCH candidate is linked to the other PDCCH candidates. For example, PDCCH candidate 225 of the first SS set may be located in monitoring occasion 210-a, and may be linked to a PDCCH candidate 230 located in monitoring occasion 220-a of the second SS set. PDCCH candidate 225 and PDCCH candidate 230 may be located in the same slot, or in different slots. In some examples, base station 205 may transmit DCI messages using PDCCH repetition over the two linked PDCCH candidates. For instance, base station 205 may transmit a first repetition of the DCI message on PDCCH candidate 225, and a second repetition of the DCI message on PDCCH candidate 230. In some examples, UE 215 may perform a soft combining procedure on PDCCH candidate 225 and PDCCH candidate 230, resulting in soft combined PDCCH candidate 235. The UE may consider soft combined PDCCH candidate 235 as an additionally monitored PDCCH candidate.

In some examples, two or more PDCCH candidates may be explicitly linked together (e.g., base station 205 may configure the linkage to UE 215 before UE 215 attempts to perform BD of the PDCCH candidates). In some examples, two or more PDCCH candidates may not be explicitly linked together, the UE 215 may identify or otherwise determine the linkage after or before decoding. However, some wireless communication systems do not provide a mechanism or other indication of how the one or more PDCCH candidates are counted for when the monitoring is applied to the BD limit configured for UE 215. For instance, UE 215 may count a number of PDCCH candidates 225 toward the BD limit of the slot in which the PDCCH candidates 225 are located, and may count a number of PDCCH candidates 230 toward the BD limit of the slot in which the PDCCH candidates 230 are located. However, UE 215 may also need to determine whether and how to count a set of soft combined PDCCH candidates 235 toward a BD limit. For instance, if UE 215 monitors for PDCCH candidates 225 and PDCCH candidates 230 during different TTIs, then UE 215 may determine whether to count soft combined PDCCH candidates 235 toward the BD limit of the first slot, or the second slot, or both.

Accordingly, wireless communications system 200 may support PDCCH repetition, where each PDCCH repetition corresponds to a PDCCH candidate, and two or more PDCCH candidates may be linked together as possible repetitions of the same DCI. Aspects of the described techniques provide different approaches for how to count the number of PDCCH candidates "for monitoring" as applied towards the BD limit of the UE.

In some examples, wireless communications system 200 may support overbooking procedures. Where overbooking is supported, base station 205 may be permitted to configure UE 215 with PDCCH candidates that exceed the BD limit (e.g., for BDs and CCEs) for a primary scheduled cell. However, UE 215 may be unable to monitor the additional PDCCH candidates that exceed the BD limit. In such examples, UE 215 may determine whether to monitor or drop (e.g., ignore or refrain from monitoring) one or more configured PDCCH candidates. For instance, in a first step of an overbooking procedure, UE 215 may exclude blind decodes or CCEs corresponding to common SSs from the limit (e.g., PDCCH candidates from common SSs may have a higher priority than PDCCH candidates from other SSs, and may not be excluded or dropped). Additionally, or alternatively, UE 215 may monitor (e.g., perform blind decodes on) remaining SSs (e.g., UE-specific SS (USSs) starting with the lowest index value and continuing to monitor USSs with increasing index values. After monitoring (e.g., performing BD procedures) on the PDCCH candidates of a USS, UE 215 may determine if a remaining number of BD procedures within the BD limit exceed the number of PDCCH candidates configured for a next USS. If so, UE 215 may blind decode the PDCCH candidates of that USS. UE 215 may continue this process until a remaining number of permitted blind decodes is less than a number of PDCCH candidates in a next USS. At that point, UE 215 may stop monitoring (e.g., may drop all remaining configured PDCCH candidates). This process may be referred to as an overbooking procedure, or as determining an overbooking condition. In some examples, overbooking is only supported or permitted in primary cells (Pcells), and is not supported on secondary cells (Scells). Overbooking may be considered and performed with reference to a per-scheduled cell limit of the primary cell.

In some examples, wireless communications system 200 may support span-based PDCCH monitoring. A span may refer to a TTI defined in terms of a (X, Y) symbols, where X may refer to a minimum time separation (e.g., in terms of a number of symbols) between a first symbol of two consecutive spans, and where Y may refer to a number of symbols in each span. Each PDCCH monitoring occasion may be located within a single span. In some examples, a BD limit may be defined per span. In some examples, if a primary cell is configured with span-based PDCH monitoring, overbooking procedures described herein may be supported on the first span of each slot (e.g., but not in subsequent spans). In other spans, UE 215 may not expect to monitor a number of PDCCH candidates that exceed the BD limit (e.g., UE 215 may not expect a number of PDCCH candidates and a number of corresponding non-overlapped CCEs per span on the primary cell to be larger than the corresponding numbers that the UE is capable of monitoring the primary cell per span. TTIs described herein may refer to slots (e.g., for slot-based PDCCH monitoring) or spans (e.g., for span-based PDCCH monitoring).

As described above, UE 215 may support PDCCH repetition, where two PDCCH candidates may be linked together for possible repetition of the same DCI. The two PDCCH candidates (e.g., PDCCH candidate 225 and PDCCH candidate 235) may be located in different SS sets (e.g., associated with corresponding CORESETs), and may be linked together for PDCCH repetition. In some examples, for purposes of counting PDCCH candidates toward the BD limit, UE 215 may consider the soft combined PDCCH candidates 235 as a third set of PDCCH candidates (e.g., when UE 215 individually decodes each PDCH candidate 225, each PDCCH candidate 230, and each soft combined PDCCH candidate 235). Because BD limits may be defined per TTI, if PDCCH candidate 225 is in a first TTI while PDCCH candidate 230 is in a different slot, UE 215 may need to determine to count the soft combined PDCCH candidates 235 toward the BD limit of one of the two TTIs. Because overbooking procedures may be based on an SS set index (e.g., starting with the lowest index), UE 215 may determine how to apply overbooking procedures to soft combined PDCCH candidates 235 (e.g., whether to consider soft combined PDCCH candidates 235 together with other PDCCH candidates, separately, or the like).

As described above, UE 215 may count soft combined PDCCH candidates 235 toward a BD limit of one or more slots. Additionally, UE 215 may determine whether or how to apply the soft combined PDCCH candidates 235 to an overbooking procedure for that slot, if overbooking procedures are supported for the slot. Techniques for counting soft combined PDCCH candidates 235 toward a BD limit of one or more TTIs when monitoring occasions are located in different TTIs, and performing overbooking procedures based on such counting, are described with reference to FIG. 3. Techniques for performing overbooking procedures when PDCCH candidates of different SS sets are located in a same TTI are described with reference to FIG. 4.

Figure 3:
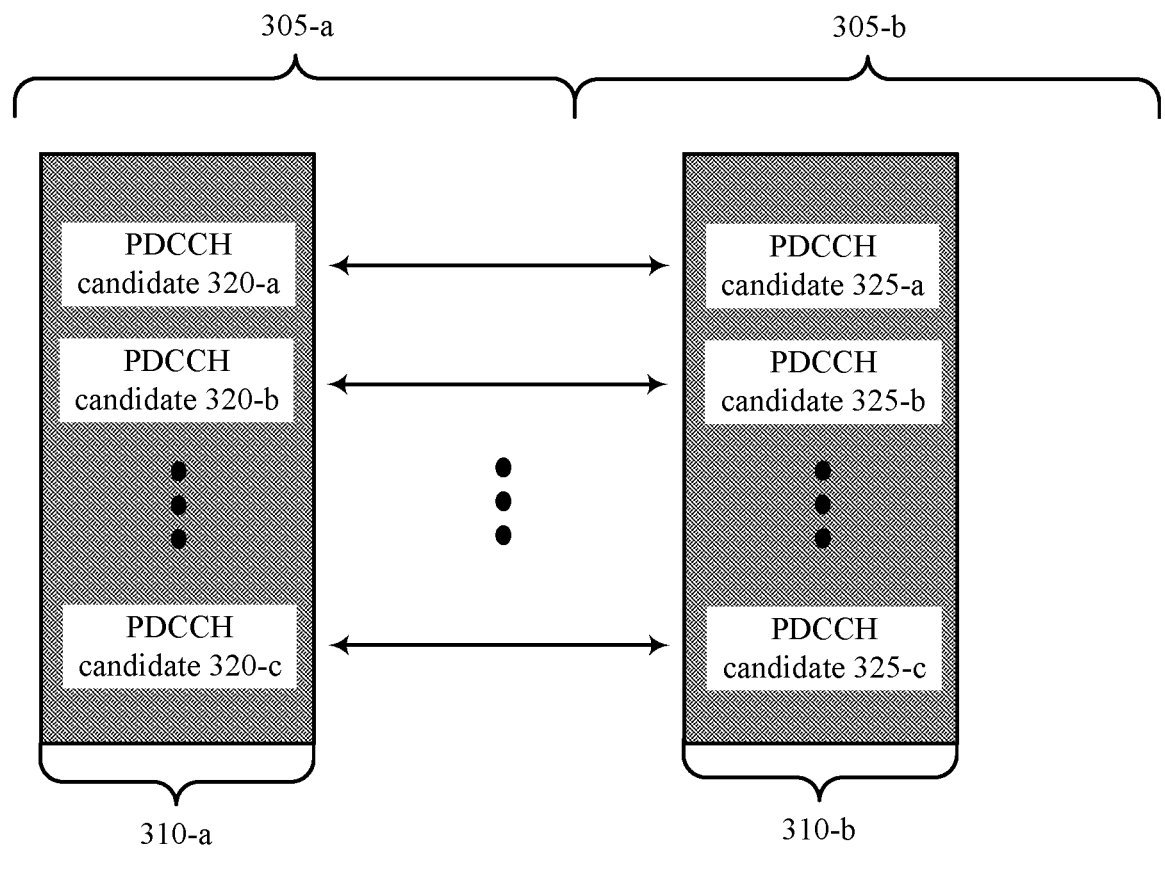
FIG. 3 illustrates an example of a monitoring scheme that supports BD limits and overbooking for PDCCH repetition in accordance with aspects of the present disclosure.

FIG. 3 illustrates an example of a monitoring scheme 300 that supports BD limits and overbooking for PDCCH repetition in accordance with aspects of the present disclosure. In some examples, monitoring scheme 300 may be performed by or may include aspects of wireless communications system 100 or wireless communications system 200. For example, a UE and base station may communicate using the monitoring scheme 300, and the UE and the base station may be examples of corresponding devices described with reference to FIG. 1 and FIG. 2.

In some examples, as described with reference to FIG. 2, a UE may be configured with multiple SS sets. Each SS set may include one or more monitoring occasions 310, and each monitoring occasion may include one or more PDCCH candidates. In some examples, SS sets may be linked for PDCCH repetition. In such examples, PDDCH candidates in different monitoring occasions 310 may be linked to each other. For example, monitoring occasion 310-a may be located in a first TTI 305-a (e.g., a slot, or a span, or the like). Monitoring occasion 310-a may be associated with a first SS set. Monitoring occasion 310-b may be located in a second TTI 305-b (e.g., a second slot, a second span, or the like). Monitoring occasion 310-b may be associated with a second SS set. PDDCH candidates 320 in monitoring occasion 310-a may be linked to respective PDCCH candidates 325 in monitoring occasion 310-b.

The UE may be configured to count the linked PDCCH candidates for PDCCH repetition as three separate monitored sets of PDDCH candidates toward a BD limit, as described in greater detail with reference to FIG. 2. For instance, a base station may transmit, to the UE, a configuration message indicating that individual PDDCH candidates 320 in a first SS set of TTI 305-a are associated with or linked to corresponding PDDCH candidates 325 in a second SS set of a second TTI 305-b. The UE may be configured to count PDCCH candidate 320-a toward a BD limit for TTI 305-a, and to count PDCCH candidate 325-a (e.g., which may be linked with PDCCH candidate 320-a) toward a BD limit for TTI 305-b. However, the UE may also be configured to count a third monitored PDCCH candidate (e.g., a soft combined PDCCH candidate) toward a BD limit. That is, the UE may soft combine PDCCH candidate 320-a and PDCCH candidate 325-a, and may count that soft combined PDCCH candidate toward a BD limit (e.g., of either TTI 305-a, TTI 305-b, or both). In some examples, the base station may transmit an instruction to count the combinations of PDCCH candidates as a third set of PDDCH candidates toward one or more BD limits. Thus, in some examples, the UE may count a first set of PDCCH candidates 320 (e.g., PDCCH candidate 320-a, PDCCH candidate 320-b, or PDCCH candidate 320-c) toward a BD limit of TTI 305-a, may count a second set of PDCCH candidates 325 (e.g., PDCCH candidate 325-a, PDCCH candidate 325-b, or PDCCH candidate 325-c) toward a BD limit of TTI 305-b, and may count a third set of PDCCH candidates (e.g., a combination of PDCCH candidates 320 with PDCCH candidates 325) toward a BD limit of TTI 305-a, TTI 305-b, or both (e.g., the UE may count the first set of PDCCH candidates 325 two times toward the BD limit of TTI 305-a or toward BD limit of TTI 305-b or both, or may count the second set of PDCCH candidates 325 two times toward the BD limit of TTI 305-b or the BD limit of TTO 305-a or both, or any combination thereof).

In some examples, the UE may count the third set of PDCCH candidates toward the BD limit of both TTI 305-a and TTI 305-b. In such examples, the UE may count a total number of PDCCH candidates 320 toward the BD limit of TTI 305-a, and may further count a total number of the third set of PDCCH candidates (e.g., the combinations of PDDCH candidates 320 with linked PDDCH candidates 325) toward the BD limit of TTI 305-a. Similarly, the UE may count a total number of PDCCH candidates 325 toward the BD limit of TTI 305-b, and may further count a total number of the third set of PDCCH candidates (e.g., the combinations of PDDCH candidates 320 with linked PDDCH candidates 325) toward the BD limit of TTI 305-b. For instance, if monitoring occasion 310-a of the first SS set includes 10 PDCCH candidates 320, then the UE may count 20 PDDCH candidates toward the BD limit of TTI 305-a (e.g., a per-slot or per-span BD limit for TTI 305-a), and may similarly count 20 PDDCH candidates toward the BD limit of TTI 305-b (e.g., a per-slot or per-span BD limit for TTI 305-b). If, for instance, assuming a SCS of 30 KHz and a BD limit per TTI of 36, then neither monitoring occasion 310-a nor monitoring occasion 310-b may exceed the respective BD limits.

In some examples, the UE may count the third set of PDDCH candidates toward the BD limit of only one TTI 305 (e.g., based on the timing of the two TTIs, index values for respective SS sets, or the like). For instance, the UE may only count the third set of PDDCH candidates toward the BD limit of the TTI 305 that is later in time (e.g., TTI 305-b). In such examples, the UE may count a total number of PDCCH candidates 320 toward the BD limit of TTI 305-a. The UE may count a total number of PDCCH candidates 325 toward the BD limit of TTI 305-b, and may further count a total number of the third set of PDCCH candidates (e.g., the combinations of PDDCH candidates 320 with linked PDDCH candidates 325) toward the BD limit of TTI 305-b. For instance, if monitoring occasion 310-a of the first SS set includes 10 PDCCH candidates 320, then the UE may count 10 PDDCH candidates 320 toward the BD limit of TTI 305-a (e.g., a per-slot or per-span BD limit for TTI 305-a), and may count 20 PDDCH candidates toward the BD limit of TTI 305-b (e.g., a per-slot or per-span BD limit for TTI 305-b). If, for instance, assuming a SCS of 30 KHz and a BD limit per TTI of 36, then neither monitoring occasion 310-a nor monitoring occasion 310-b may exceed the respective BD limits.

In both examples described above, the UE may count or otherwise determine a total number of PDDCH candidates associated with the second SS set (e.g., in TTI 305-b) to be counted toward the BD limit of TTI 305-b by counting each PDDCH candidate 325 of the second TTI 305-b, and by counting each combination of individual PDDCH candidates 320 with corresponding PDDCH candidates 325. The UE may compare the total number of PDDCH candidates (e.g., the PDDCH candidates 325 and the combinations of PDDCH candidates) with the BD limit, and may also compare any number of other PDDCH candidates associated with the second TTI 305-b (e.g., other PDDCH candidates in USSs, CSSs, other SS sets, or the like, located in TTI 305-b) with the BD limit. In some examples (e.g., where the UE counts the third set of PDDCH candidates toward respective BD limits of both TTIs 305), the UE may additionally determine a total number of PDDCH candidates associated with the first SS set to be counted toward the BD limit of the first TTI 305-a by counting each PDCCH candidate 320 and each combination of PDDCH candidates 320 with associated PDDCH candidates 325. The UE may compare the total number of PDDCH candidates counted, and any other PDDCH candidates associated with the first TTI 305-a, with the BD limit for TTI 305-a.

In some examples, the UE may also determine that an overbooking condition exists for a TTI 305. For example, as described in greater detail with reference to FIG. 2, a base station may configure the UE with more PDCCH candidates than it is permitted to monitor under a BD limit for a given TTI 305. In such examples, the UE may evaluate the overbooking condition of a given TTI 305 based on the number of PDDCH candidates in that TTI 305, and may also consider the number of combinations of PDDCH candidates counted toward the BD limit of that TTI 305.

In the case described herein where the UE counts the combinations of PDCCH candidates 320 and linked PDDCH candidates 325 toward the BD limit of TTI 305-b, the UE may determine whether an overbooking condition is satisfied by evaluating the total number of PDDCH candidates counted toward the BD limit together. In such examples, as part of an overbooking procedure as described with reference to FIG. 2, the UE may determine whether a remaining available number of PDCCH candidates counted toward the BD limit exceeds the total number of PDDCH candidates (including the PDDCH candidates 325 and the combinations of PDDCH candidates). If so, then the UE may count the total number of PDDCH candidates toward the BD limit and may monitor all of the total number of PDDCH candidates. Otherwise, the UE may drop all of the total number of PDDCH candidates (e.g., may not monitor them for control signaling), and may terminate the overbooking procedure.

In some examples, the UE may determine whether an overbooking condition is satisfied by evaluating the PDCCH candidates 325 separately from the combinations of PDDCH candidates 320 and PDDCH candidates 325. For example, as part of an overbooking procedure, the UE may determine whether a remaining available number of PDDCH candidates counted toward the BD limit for TTI 305-b exceeds the number of PDDCH candidates 325. If not, then the UE may drop the PDDCH candidates 325, and may terminate the overbooking procedure (e.g., may not count any more PDCCH candidates toward the BD limit of TTI 305-b). Otherwise, the UE may count the number of PDDCH candidates 325 toward the BD limit, and may then reevaluate if an updated remaining number of PDDCH candidates counted toward the BD limit for TTI 305-b exceeds the number of combinations PDDCH candidates 320 and PDDCH candidates 325. If so, then the UE may count the combinations toward the BD limit. If not, the UE may drop the combinations of PDCCH candidates, and may terminate the overbooking procedure. In some examples, the UE may consider the combinations prior to considering the PDDCH candidates 325 (e.g., based on an index value, or the like).

If, as described herein, the UE only counts the combinations of PDDCH candidates toward the BD limit of the latter TTI 305-b, then the UE may consider the combinations of PDDCH candidates (e.g., together with or separate from the individual PDDCH candidates 325 of TTI 305-b) with respect to overbooking conditions of TTI 305-b. If the UE counts the combinations of PDDCH candidates toward the BD limit of both TTIs 305-a and 305-b, then the UE may consider the combinations of PDDCH candidates (e.g., together with or separate from the individual PDCCH candidates 320 and 325 of TTI 305-a and TTI 305-b, respectively) with respect to overbooking conditions of TTI 305-a and TTI 305-b.

The techniques described herein may apply to slot-based PDDCH repetition and overbooking procedures, or span-based PDCCH repetition and overbooking procedures, and TTIs 305 may be examples of slots, spans, or other time durations.

In some examples, monitoring occasions may be located in the same TTI, as described in greater detail with reference to FIG. 4.

Figure 4:
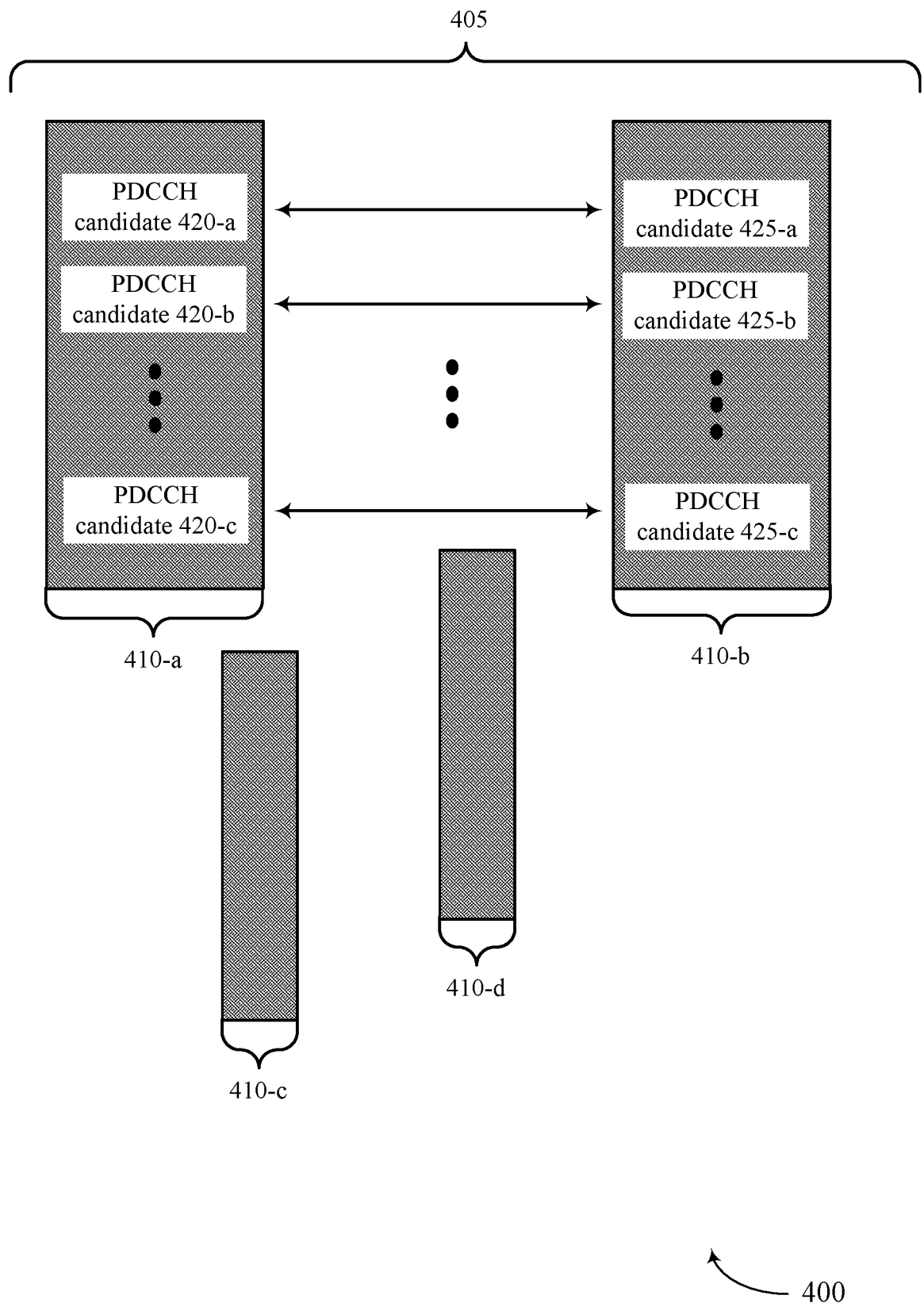
FIG. 4 illustrates an example of a monitoring scheme that supports BD limits and overbooking for PDCCH repetition in accordance with aspects of the present disclosure.

FIG. 4 illustrates an example of a monitoring scheme 400 that supports BD limits and overbooking for PDCCH repetition in accordance with aspects of the present disclosure. In some examples, monitoring scheme 400 may be performed by or may implement aspects of wireless communications system 100 or wireless communications system 200. For example, a UE and base station may communicate using the monitoring scheme 400, and the UE and the base station may be examples of corresponding devices described with reference to FIG. 1 and FIG. 2.

In some examples, a base station may configure a UE with one or more SS sets. For example, the base station may transmit a configuration message indicating that individual PDDCH candidates 420 in a monitoring occasion 410-a of a first SS set are linked with corresponding PDDCH candidates 425 located in a second monitoring occasion 410-b of a second SS set, all during the same TTI 405 (e.g., a slot or a span). In such examples, the UE may determine that an overbooking condition (e.g., associated with overbooking of PDCCH candidates within the TTI 405) exists. For example, the base station may configure the UE with more PDCCH candidates than the UE is permitted to monitor under a BD limit for TTI 405. The total number of PDCCH candidates in the TTI may include PDDCH candidates 420 located in monitoring occasion 410-a of the first SS set, PDDCH candidates 425 located in monitoring occasion 410-b of the second SS set, one or more PDCCH candidates of a CSS located in a CSS monitoring occasion 410-c, one or more PDCCH candidates of a USS located in a USS monitoring occasion 410-d, or the like.

In some examples, the UE may be configured for PDCCH repetition across multiple SS sets. For instance, the first SS set and the second SS set in TTI 405 may be linked such that each PDDCH candidate 420 (e.g., 10 PDCCH candidates 420 including PDCCH candidate 420-a, PDCCH candidate 420-b, or PDCCH candidate 420-c) may be linked with PDCCH candidates 425 (e.g., 10 PDCCH candidates 425 including PDCCH candidate 425-a, PDCCH candidate 425-b, and PDCCH candidate 425-c) that have the same index across the SS sets. The base station may configure the UE to count two PDCCH candidates linked for repetition as three monitored PDDCH candidates toward the BD limit per TTI for overbooking purposes (e.g., on a Pcell).

In some examples, the UE may determine whether an overbooking condition is satisfied (e.g., may count a next set of PDCCH candidates toward a BD limit without exceeding the BD limit, or may drop the PDCCH candidates and terminate the overbooking procedure) by considering individual candidates in the two SSS sets together with the combined PDCCH candidates. In such examples, the total number of PDCCH candidates (e.g., including PDCCH candidates 420, PDCCH candidates 425, and the combinations of PDCCH candidates 420 and PDCCH candidates 425) are monitored, or are dropped, based on the overbooking procedure.

In some examples, the UE may determine whether an overbooking condition is satisfied (e.g., may count a next set of PDCCH candidates toward a BD limit without exceeding the BD limit, or may drop the PDCCH candidates and terminate the overbooking procedure) by considering the combinations of PDCCH candidates 420 and PDCCH candidates 425 together with PDCCH candidates of one of the two SS sets. For example, the UE may evaluate the PDCCH candidates 420 together with the combinations of PDCCH candidates 420 and PDCCH candidates 425, and may separately evaluate the PDCCH candidates 425. In such examples, the PDCCH candidates 420 together with the combinations of PDCCH candidates 420 and PDCCH candidates 425 may all be dropped, or may all be monitored, based on the overbooking procedure. Then, separately, the UE may consider the PDCCH candidates 425.

In some examples, the UE may determine which of the two SS sets with which to group the combinations of PDCCH candidates. For example, the UE may group the combinations of PDCCH candidates with the PDCCH candidates 420-a of the first SS set based on a timing of the monitoring occasions 410-a. For instance, the UE may select the earlier monitoring occasion (e.g., monitoring occasion 410-a), and may group the combinations of PDCCH candidates with the PDCCH candidates 420 of the first SS set.

Alternatively, the UE may select the later monitoring occasion (e.g., monitoring occasion 410-*b*), and may group the combinations of PDCCH candidates with the PDCCH candidates 425 of the second SS set. In some examples, the UE may group the combinations of PDCCH candidates based on an index value of the SS sets. For instance, the UE may group the combinations of PDCCH candidates with the PDDCH candidates 420 of the first SS set based on the first SS set having a higher (or lower) index value than the second SS set. In some examples, the UE may group the combinations of PDCCH candidates based on an index value of CORESETs associated with the respective SS sets. For instance, the UE may group the combinations of PDCCH candidates with the PDDCH candidates 420 of the first SS set based on the first SS set being associated with a CORESET having a higher (or lower) index value than the CORESET associated with the second SS set.

In some examples, the UE may determine whether an overbooking condition is satisfied (e.g., may count a next set of PDCCH candidates toward a BD limit without exceeding the BD limit, or may drop the PDCCH candidates and terminate the overbooking procedure) by considering the combinations of PDCCH candidates 420 and PDCCH candidates 425, the PDCCH candidates 420, and the PDCCH candidates 425, separately. For example, the UE may evaluate the PDCCH candidates 420 separately with respect to the overbooking conditions, the PDCCH candidates 425 separately with respect to the overbooking condition, and the combinations of PDCCH candidates 420 and PDCCH candidates 425 separately with respect to the overbooking conditions. In such examples, the PDCCH candidates 420 may all be dropped, or may all be monitored, the PDCCH candidates 425 may all be dropped or may all be monitored, and the combinations of PDCCH candidates 420 and PDCCH candidates 425 may all be dropped or may all be monitored, independently of each other, based on the overbooking procedure.

In some examples, the first SS set and the second SS set may be used for PDCCH repetition in the same TTI 405. Each of the first monitoring occasion 410-*a* and second monitoring occasion 410-*b* may include 10 PDCCH candidates, respectively, and each PDDCH candidate 420 may be linked to a PDCCH candidate 425 that has the same index value. Monitoring occasion 410-*c* of a CSS may include 6 PDCCH candidates. Monitoring occasion 410-*d* of a USS (e.g., a part of a regular S set and not used for PDCCH repetition) may include 8 PDCCH candidates. In some examples, assuming an SCS of 39 KHz, the BD limit for TTI 405 may be 36 PDCCH candidates. Thus, to perform an overbooking procedure, the UE may first exclude the 6 PDCCH candidates of the CSS, resulting in a remaining number of available PDCCH candidates of 30 (e.g., 36-6). If the SS set of monitoring occasion 410-*d* has a lower index than the first SS set and the second SS set, then the UE may first monitor the 8 individual PDCCH candidates in monitoring occasion 410-*d*, resulting in a remaining BD limit budget of 22 PDCCH candidates (e.g., 30-8).

In such examples, the UE may then evaluate an overbooking condition for the first SS set and the second SS set, including the combinations of PDCCH candidates, as described above. That is, the UE may compare a number of PDCCH candidates 420 to the BD limit, a number of PDCCH candidates 425 to the BD limit, a number of combinations of PDCCH candidates to the BD limit, together, separately, or in sub-groups. For example, as described herein, the UE may consider the PDDCH candidates 420, the PDCCH candidates 425, and the combined PDCCH candidates together (e.g., 30 PDCCH candidates total). In such examples, because the total number of PDCCH candidates exceeds the remaining BD limit budget (e.g., 22 PDCCH candidates), the UE may drop (e.g., ignore or refrain from monitoring) all of the PDDCH candidates 420, the PDCCH candidates 425, and the combined PDCCH candidates.

In some examples, as described herein, the UE may consider the PDCCH candidates 420 separately, and may consider the PDCCH candidates 425 together with the combined PDCCH candidates. In such examples, if the first SS set for monitoring occasion 410-*a* has a lower index number than the second SS set, the UE may first consider the PDCCH candidates 420. Because the number of PDDCH candidates 420 does not exceed the remaining BD limit budget (e.g., 22 PDCCH candidates), the UE may monitor PDCCH candidates 420 and count them toward the BD limit of TTI 405, resulting in a remaining BD limit budget of 12 PDCCH candidates. In such examples, the UE may then consider the PDCCH candidates 425 together with the combinations of PDCCH candidates (e.g., 20 PDCCH candidates), which may exceed the remaining BD limit budget of 12 PDCCH candidates. This may result in the UE dropping the PDCCH candidates 425 and the combinations of PDCCH candidates. Thus, in such examples as described herein, where the UE compares a first index value associated with the first SS set with a second index value associated with the second SS set (e.g., where the second index value associated with the second SS set is greater than the first index value associated with the first SS set), the UE may determine whether the overbooking condition is satisfied by counting each PDCCH candidate 425 two times.

In some examples, as described herein, the UE may consider each of the PDDCH candidates 420, the PDCCH candidates 425, and the combined PDCCH candidates separately for purposes of an overbooking procedure. For example, the UE may determine that the number of PDCCH candidates 420 (e.g., 10) is less than the available remaining BD limit budget (e.g., 22 PDCCH candidates), and may monitor the PDCCH candidates 420. Subsequently, the UE may determine that the number of PDCCH candidates 425 (e.g., 10), is less than an updated remaining BD limit budget (e.g., 12 PDCCH candidates), and may monitor the PDCCH candidates 425. The UE may also determine that a number of combinations of PDCCH candidates 420 and PDCCH candidates 425 (e.g., 10) is greater than the updated remaining BD limit budget (e.g., 2 PDCCH candidates), and may refrain from monitoring the combinations of PDCCH candidates.

Figure 5:
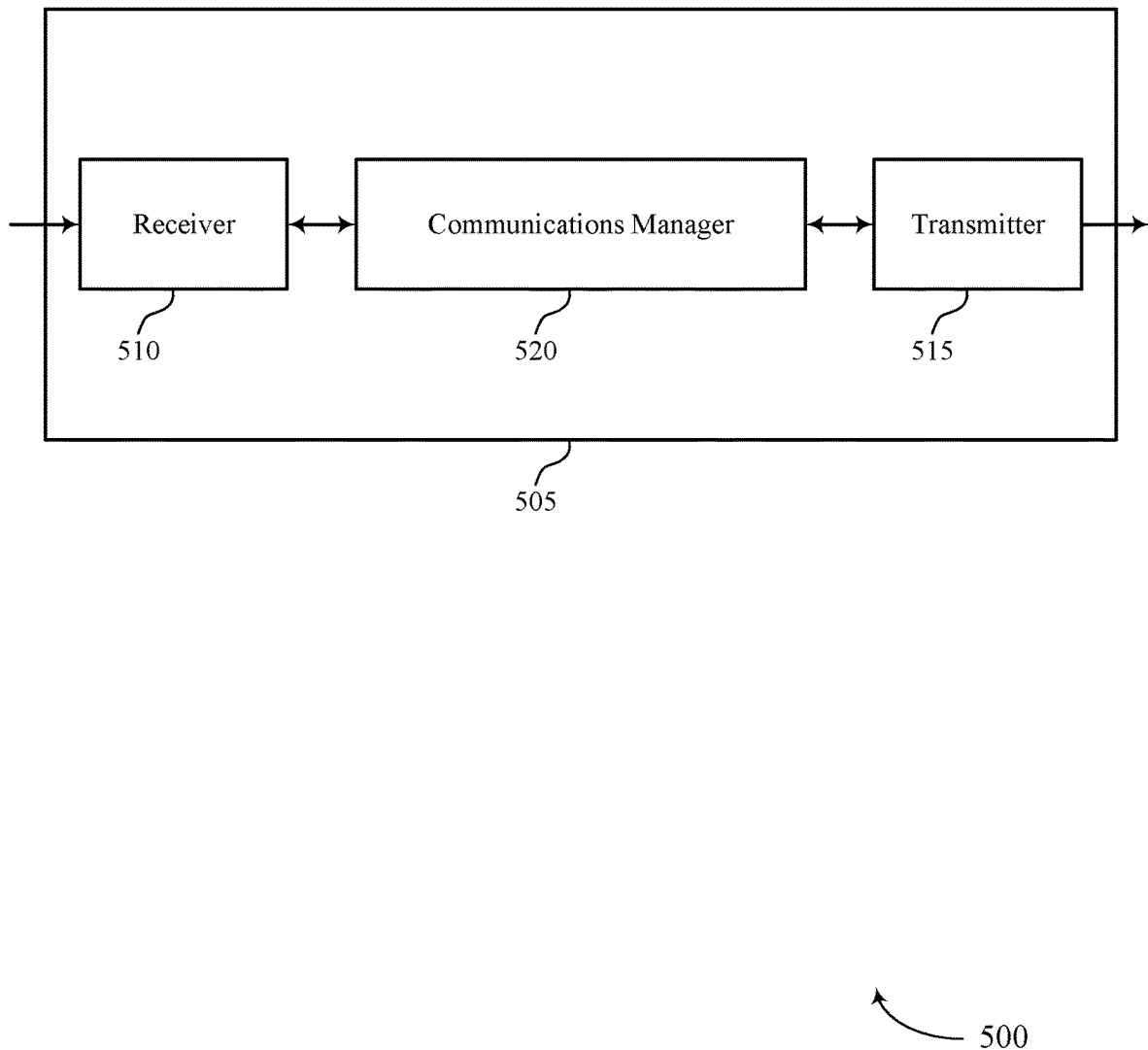
FIGS. 5 and 6 show block diagrams of devices that support BD limits and overbooking for PDCCH repetition in accordance with aspects of the present disclosure.

FIG. 5 shows a block diagram 500 of a device 505 that supports BD limits and overbooking for PDCCH repetition in accordance with aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to BD limits and overbooking for PDCCH repetition). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to BD limits and overbooking for PDCCH repetition). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of BD limits and overbooking for PDCCH repetition as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in hardware, software (e.g., executed by a processor), or any combination thereof. If implemented in software executed by a processor, the functions of the communications manager 520, the receiver 510, the transmitter 515, or various combinations or components thereof may be performed by a general-purpose processor, a DSP, a central processing unit (CPU), a graphics processing unit (GPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communications at a UE in accordance with examples as disclosed herein. For example, the communications manager 520 may be configured as or otherwise support a means for receiving, from a base station, a configuration message that indicates that individual ones of a first group of downlink control channel candidates in a first SS set of a first TTI are associated with corresponding ones of a second group of downlink control channel candidates in a second SS set of a second TTI which is after the first TTI. The communications manager 520 may be configured as or otherwise support a means for determining a total number of downlink control channel candidates associated with the second SS set to be counted towards a BD limit of the second TTI by counting each downlink control channel candidate of the second group of downlink control channel candidates two times. The communications manager 520 may be configured as or otherwise support a means for monitoring for downlink control channel transmissions during the second TTI based on the counting of the BD limit of the second TTI.

Additionally, or alternatively, the communications manager 520 may support wireless communications at a UE in accordance with examples as disclosed herein. For example, the communications manager 520 may be configured as or otherwise support a means for receiving, from a base station, a configuration message that indicates that individual ones of a first group of downlink control channel candidates in a first SS set of a TTI are associated with corresponding ones of a second group of downlink control channel candidates in a second SS set of the TTI. The communications manager 520 may be configured as or otherwise support a means for determining that an overbooking condition associated with overbooking of downlink control channel candidates within the TTI exists. The communications manager 520 may be configured as or otherwise support a means for evaluating the overbooking condition based on respective numbers of the first group of downlink control channel candidates and the second group of downlink control channel candidates. The communications manager 520 may be configured as or otherwise support a means for monitoring for downlink control channel transmissions during the TTI based on the evaluation of the overbooking condition.

By including or configuring the communications manager 520 in accordance with examples as described herein, the device 505 (e.g., a processor controlling or otherwise coupled to the receiver 510, the transmitter 515, the communications manager 520, or a combination thereof) may support techniques for PDCCH monitoring resulting in increased system efficiency, more efficient utilization of available resources, more efficient use of UE computational resources, or the like.

Figure 6:
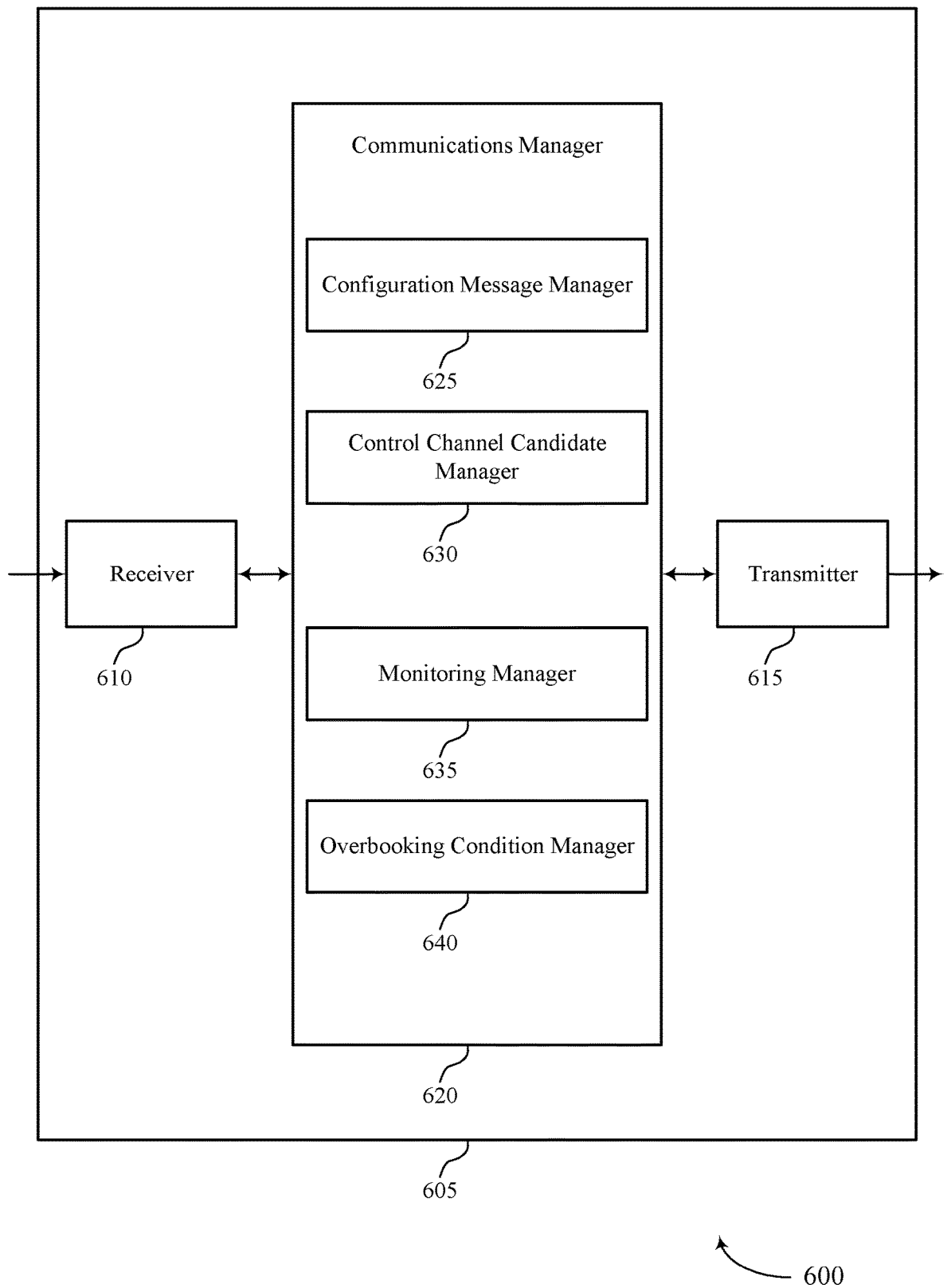

FIG. 6 shows a block diagram 600 of a device 605 that supports BD limits and overbooking for PDCCH repetition in accordance with aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to BD limits and overbooking for PDCCH repetition). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to BD limits and overbooking for PDCCH repetition). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of BD limits and overbooking for PDCCH repetition as described herein. For example, the communications manager 620 may include a configuration message manager 625, a control channel candidate manager 630, a monitoring manager 635, an overbooking condition manager 640, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communications at a UE in accordance with examples as disclosed herein. The configuration message manager 625 may be configured as or otherwise support a means for receiving, from a base station, a configuration message that indicates that individual ones of a first group of downlink control channel candidates in a first SS set of a first TTI are associated with corresponding ones of a second group of downlink control channel candidates in a second SS set of a second TTI which is after the first TTI. The control channel candidate manager 630 may be configured as or otherwise support a means for determining a total number of downlink control channel candidates associated with the second SS set to be counted towards a BD limit of the second TTI by counting each downlink control channel candidate of the second group of downlink control channel candidates two times. The monitoring manager 635 may be configured as or otherwise support a means for monitoring for downlink control channel transmissions during the second TTI based on the counting of the BD limit of the second TTI.

Additionally, or alternatively, the communications manager 620 may support wireless communications at a UE in accordance with examples as disclosed herein. The configuration message manager 625 may be configured as or otherwise support a means for receiving, from a base station, a configuration message that indicates that individual ones of a first group of downlink control channel candidates in a first SS set of a TTI are associated with corresponding ones of a second group of downlink control channel candidates in a second SS set of the TTI. The overbooking condition manager 640 may be configured as or otherwise support a means for determining that an overbooking condition associated with overbooking of downlink control channel candidates within the TTI exists. The overbooking condition manager 640 may be configured as or otherwise support a means for evaluating the overbooking condition based on respective numbers of the first group of downlink control channel candidates and the second group of downlink control channel candidates. The monitoring manager 635 may be configured as or otherwise support a means for monitoring for downlink control channel transmissions during the TTI based on the evaluation of the overbooking condition.

Figure 7:
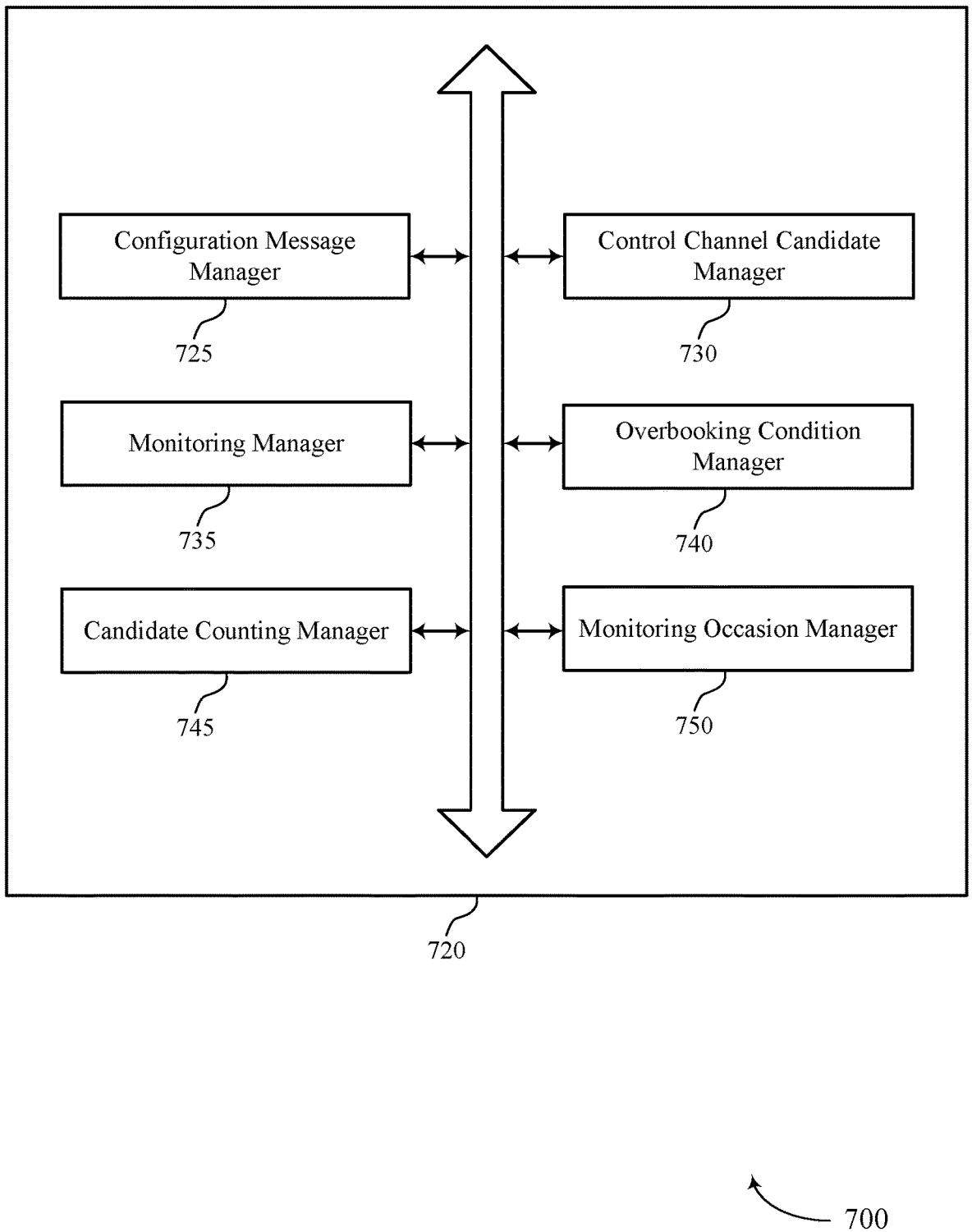
FIG. 7 shows a block diagram of a communications manager that supports BD limits and overbooking for PDCCH repetition in accordance with aspects of the present disclosure.

FIG. 7 shows a block diagram 700 of a communications manager 720 that supports BD limits and overbooking for PDCCH repetition in accordance with aspects of the present disclosure. The communications manager 720 may be an example of aspects of a communications manager 520, a communications manager 620, or both, as described herein. The communications manager 720, or various components thereof, may be an example of means for performing various aspects of BD limits and overbooking for PDCCH repetition as described herein. For example, the communications manager 720 may include a configuration message manager 725, a control channel candidate manager 730, a monitoring manager 735, an overbooking condition manager 740, a candidate counting manager 745, a monitoring occasion manager 750, or any combination thereof. Each of these components may communicate, directly or indirectly, with one another (e.g., via one or more buses).

The communications manager 720 may support wireless communications at a UE in accordance with examples as disclosed herein. The configuration message manager 725 may be configured as or otherwise support a means for receiving, from a base station, a configuration message that indicates that individual ones of a first group of downlink control channel candidates in a first SS set of a first TTI are associated with corresponding ones of a second group of downlink control channel candidates in a second SS set of a second TTI which is after the first TTI. The control channel candidate manager 730 may be configured as or otherwise support a means for determining a total number of downlink control channel candidates associated with the second SS set to be counted towards a BD limit of the second TTI by counting each downlink control channel candidate of the second group of downlink control channel candidates two times. The monitoring manager 735 may be configured as or otherwise support a means for monitoring for downlink control channel transmissions during the second TTI based on the counting of the BD limit of the second TTI.

In some examples, the overbooking condition manager 740 may be configured as or otherwise support a means for determining that an overbooking condition associated with overbooking of downlink control channel candidates within the second TTI exists. In some examples, the overbooking condition manager 740 may be configured as or otherwise support a means for evaluating the overbooking condition based on respective numbers of the second group of downlink control channel candidates and each combination of individual ones of the first group of downlink control channel candidates with corresponding ones of the second group of downlink control channel candidates, where the monitoring for downlink control channel transmissions is further based on the evaluation of the overbooking condition.

In some examples, to support evaluating the overbooking condition, the overbooking condition manager 740 may be configured as or otherwise support a means for determining whether the overbooking condition is satisfied by evaluating the total number of downlink control channel candidates associated with the second SS set together.

In some examples, to support evaluating the overbooking condition, the overbooking condition manager 740 may be configured as or otherwise support a means for determining whether the overbooking condition is satisfied by evaluating the second group of downlink control channel candidates separate from the combinations of individual ones of the first group of downlink control channel candidates with corresponding ones of the second group of downlink control channel candidates.

In some examples, the candidate counting manager 745 may be configured as or otherwise support a means for determining to count the first group of downlink control channel candidates, the second group of downlink control channel candidates, and a third group of downlink control channel candidates towards a BD limit per TTI based at least in part on the configuration message, wherein the third group of downlink control channel candidates comprises a combination of individual ones of the first group of downlink control channel candidates with corresponding ones of the second group of downlink control channel candidates, and monitoring for downlink control channel transmissions during the second TTI based on the counting of the BD limit of the second TTI. In some examples, the candidate counting manager 745 may be configured as or otherwise support a means for counting the second group of downlink control channel candidates and the third group of downlink control channel candidates towards the BD limit of the second TTI. In some examples, the monitoring manager 735 may be configured as or otherwise support a means for monitoring for downlink control channel transmissions during the second TTI based at least in part on the counting towards the BD limit of the second TTI.

In some examples, the overbooking condition manager 740 may be configured as or otherwise support a means for determining that an overbooking condition associated with overbooking of downlink control channel candidates within the first TTI exists. In some examples, the overbooking condition manager 740 may be configured as or otherwise support a means for evaluating the overbooking condition based on respective numbers of the first group of downlink control channel candidates and each combination of individual ones of the first group of downlink control channel candidates with corresponding ones of the second group of downlink control channel candidates, where the monitoring for downlink control channel transmissions is further based on the evaluation of the overbooking condition.

In some examples, to support evaluating the overbooking condition, the overbooking condition manager 740 may be configured as or otherwise support a means for determining whether the overbooking condition is satisfied by evaluating the total number of downlink control channel candidates associated with the first SS set together.

In some examples, to support evaluating the overbooking condition, the overbooking condition manager 740 may be configured as or otherwise support a means for determining whether the overbooking condition is satisfied by evaluating the first group of downlink control channel candidates separate from the combinations of individual ones of the first group of downlink control channel candidates with corresponding ones of the second group of downlink control channel candidates.

In some examples, the second TTI includes one of a time slot or a time span. In some examples, the first TTI includes one of a time slot or a time span.

In some examples, the candidate counting manager 745 may be configured as or otherwise support a means for receiving, from the base station, an instruction to count, towards the BD limit of the second TTI, a combination of individual ones of the first group of downlink control channel candidates with corresponding ones of the second group of downlink control channel candidates separately from a number of downlink control channel candidates in the second group of downlink control channel candidates, where determining the total number of downlink control channel candidates associated with the second SS set is based on the instruction.

Additionally, or alternatively, the communications manager 720 may support wireless communications at a UE in accordance with examples as disclosed herein. In some examples, the configuration message manager 725 may be configured as or otherwise support a means for receiving, from a base station, a configuration message that indicates that individual ones of a first group of downlink control channel candidates in a first SS set of a TTI are associated with corresponding ones of a second group of downlink control channel candidates in a second SS set of the TTI. The overbooking condition manager 740 may be configured as or otherwise support a means for determining that an overbooking condition associated with overbooking of downlink control channel candidates within the TTI exists. In some examples, the overbooking condition manager 740 may be configured as or otherwise support a means for evaluating the overbooking condition based on respective numbers of the first group of downlink control channel candidates and the second group of downlink control channel candidates. In some examples, the monitoring manager 735 may be configured as or otherwise support a means for monitoring for downlink control channel transmissions during the TTI based on the evaluation of the overbooking condition.

In some examples, the monitoring manager 735 may be configured as or otherwise support a means for comparing a first index value associated with the first SS set with a second index value associated with the second SS set. In some examples, the monitoring manager 735 may be configured as or otherwise support a means for determining whether the overbooking condition is satisfied by counting each downlink control channel candidate of the second group of downlink control channel candidates two times based on determining that the second index value associated with the second SS set is greater than the first index value associated with the first SS set.

In some examples, to support evaluating the overbooking condition, the overbooking condition manager 740 may be configured as or otherwise support a means for determining whether the overbooking condition is satisfied by evaluating the number of the first group of downlink control channel candidates, the number of the second group of downlink control channel candidates, and each combination of individual ones of the first group of downlink control channel candidates with corresponding ones of the second group of downlink control channel candidates, together.

In some examples, to support evaluating the overbooking condition, the overbooking condition manager 740 may be configured as or otherwise support a means for determining whether the overbooking condition is satisfied by evaluating the number of the first group of downlink control channel candidates or the second group of downlink control channel candidates, and a third group of downlink control channel candidates, where the third group comprises a combination of individual ones of the first group of downlink control channel candidates with corresponding ones of the second group of downlink control channel candidates.

In some examples, the monitoring occasion manager 750 may be configured as or otherwise support a means for comparing a last monitoring occasion of the first SS set with a last monitoring occasion of the second SS set. In some examples, the monitoring occasion manager 750 may be configured as or otherwise support a means for determining that the last monitoring occasion of the first SS set is later in time than the last monitoring occasion of the second SS set. In some examples, the monitoring manager 735 may be configured as or otherwise support a means for determining whether to monitor the number of the first group of downlink control channel candidates, and each combination of individual ones of the first group of downlink control channel candidates with corresponding ones of the second group of downlink control channel candidates, based on determining that the last monitoring occasion of the first SS set is later in time than the last monitoring occasion of the second SS set.

In some examples, the monitoring manager 735 may be configured as or otherwise support a means for comparing a first index value associated with the first SS set with a second index value associated with the second SS set. In some examples, the monitoring manager 735 may be configured as or otherwise support a means for determining to monitor the number of the second group of downlink control channel candidates and the third group of downlink control channel candidates together based on determining that the second index value associated with the second SS set is greater than the first index value associated with the first SS set.

In some examples, the monitoring manager 735 may be configured as or otherwise support a means for comparing a first index value of a first control resource set associated with the first SS set with a second index of a second control resource set associated with the second SS set. In some examples, the monitoring manager 735 may be configured as or otherwise support a means for determining whether to the number of the first group of downlink control channel candidates, and each combination of individual ones of the first group of downlink control channel candidates with corresponding ones of the second group of downlink control channel candidates based on the comparing.

In some examples, to support evaluating the overbooking condition, the overbooking condition manager 740 may be configured as or otherwise support a means for determining whether the overbooking condition is satisfied by evaluating the first group of downlink control channel candidates, the second group of downlink control channel candidates, and the combinations of individual ones of the first group of downlink control channel candidates with corresponding ones of the second group of downlink control channel candidates, separate from each other.

In some examples, the TTI includes one of a time slot or a time span.

Figure 8:
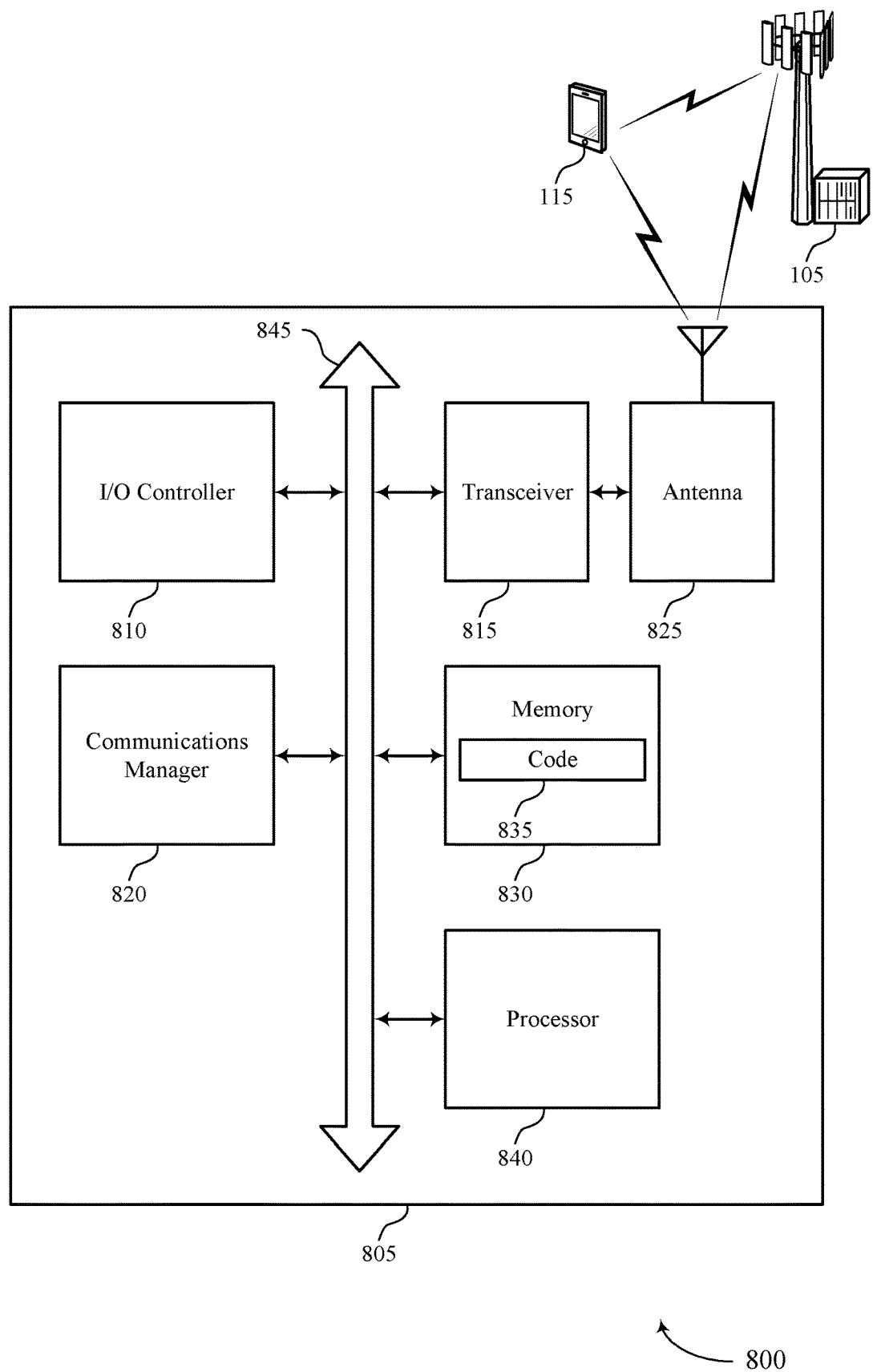
FIG. 8 shows a diagram of a system including a device that supports BD limits and overbooking for PDCCH repetition in accordance with aspects of the present disclosure.

FIG. 8 shows a diagram of a system 800 including a device 805 that supports BD limits and overbooking for PDCCH repetition in accordance with aspects of the present disclosure. The device 805 may be an example of or include the components of a device 505, a device 605, or a UE 115 as described herein. The device 805 may communicate wirelessly with one or more base stations 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally, or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a GPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting BD limits and overbooking for PDCCH repetition). For example, the device 805 or a component of the device 805 may include a processor 840 and memory 830 coupled to the processor 840, the processor 840 and memory 830 configured to perform various functions described herein.

The communications manager 820 may support wireless communications at a UE in accordance with examples as disclosed herein. For example, the communications manager 820 may be configured as or otherwise support a means for receiving, from a base station, a configuration message that indicates that individual ones of a first group of downlink control channel candidates in a first SS set of a first TTI are associated with corresponding ones of a second group of downlink control channel candidates in a second SS set of a second TTI which is after the first TTI. The communications manager 820 may be configured as or otherwise support a means for determining a total number of downlink control channel candidates associated with the second SS set to be counted towards a BD limit of the second TTI by counting each downlink control channel candidate of the second group of downlink control channel candidates two times. The communications manager 820 may be configured as or otherwise support a means for monitoring for downlink control channel transmissions during the second TTI based on the counting of the BD limit of the second TTI.

Additionally, or alternatively, the communications manager 820 may support wireless communications at a UE in accordance with examples as disclosed herein. For example, the communications manager 820 may be configured as or otherwise support a means for receiving, from a base station, a configuration message that indicates that individual ones of a first group of downlink control channel candidates in a first SS set of a TTI are associated with corresponding ones of a second group of downlink control channel candidates in a second SS set of the TTI. The communications manager 820 may be configured as or otherwise support a means for determining that an overbooking condition associated with overbooking of downlink control channel candidates within the TTI exists. The communications manager 820 may be configured as or otherwise support a means for evaluating the overbooking condition based on respective numbers of the first group of downlink control channel candidates and the second group of downlink control channel candidates. The communications manager 820 may be configured as or otherwise support a means for monitoring for downlink control channel transmissions during the TTI based on the evaluation of the overbooking condition.

By including or configuring the communications manager 820 in accordance with examples as described herein, the device 805 may support techniques for PDCCH monitoring resulting in increased system efficiency, more efficient utilization of available resources, more efficient use of UE computational resources, or the like.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of BD limits and overbooking for PDCCH repetition as described herein, or the processor 840 and the memory 830 may be otherwise configured to perform or support such operations.

Figure 9:
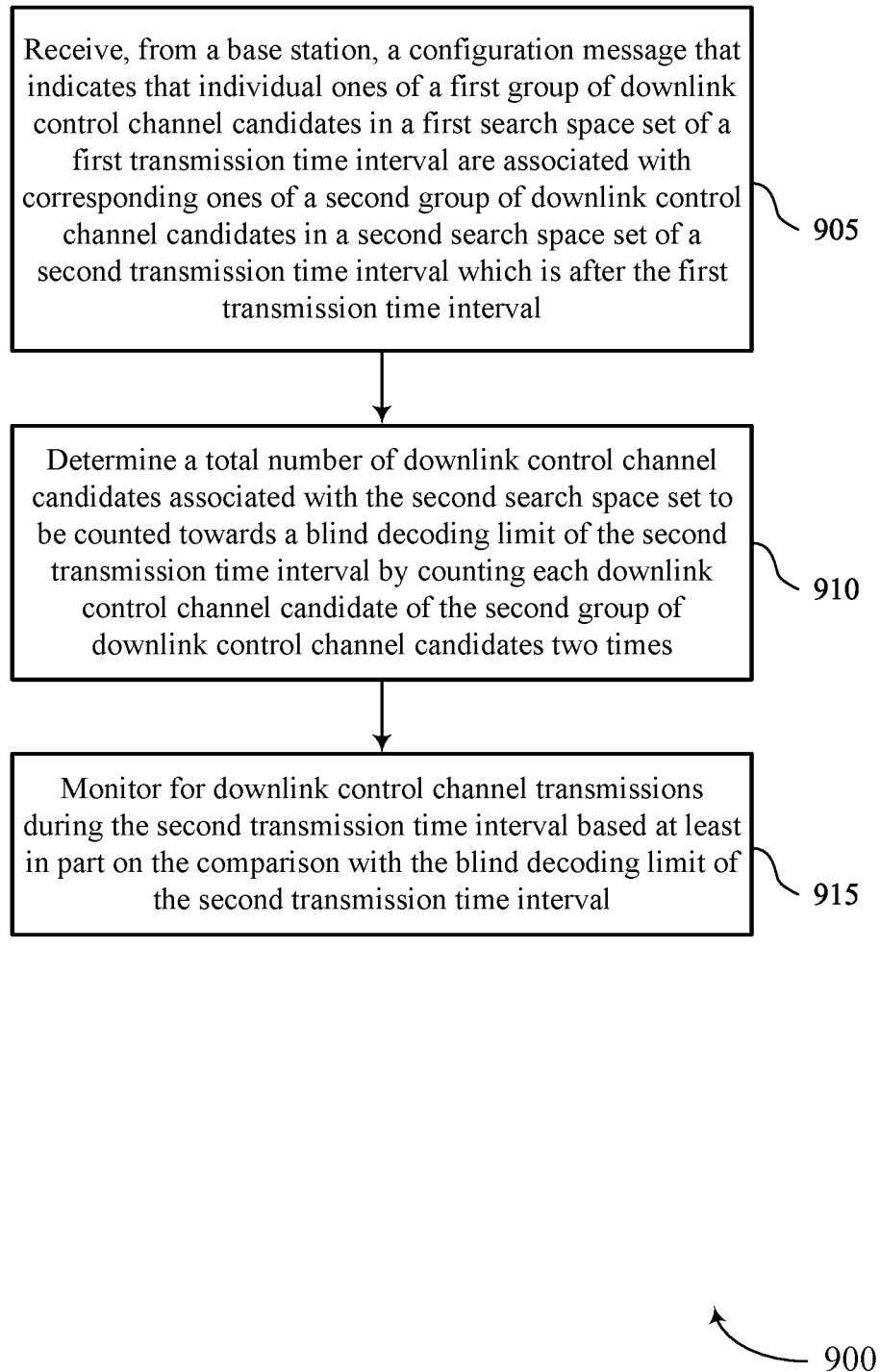
FIGS. 9 through 11 show flowcharts illustrating methods that support BD limits and overbooking for PDCCH repetition in accordance with aspects of the present disclosure.

FIG. 9 shows a flowchart illustrating a method 900 that supports BD limits and overbooking for PDCCH repetition in accordance with aspects of the present disclosure. The operations of the method 900 may be implemented by a UE or its components as described herein. For example, the operations of the method 900 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 905, the method may include receiving, from a base station, a configuration message that indicates that individual ones of a first group of downlink control channel candidates in a first SS set of a first TTI are associated with corresponding ones of a second group of downlink control channel candidates in a second SS set of a second TTI which is after the first TTI. The operations of 905 may be performed in accordance with examples as disclosed herein. In some examples, aspects of the operations of 905 may be performed by a configuration message manager 725 as described with reference to FIG. 7.

At 910, the method may include determining a total number of downlink control channel candidates associated with the second SS set to be counted towards a BD limit of the second TTI by counting each downlink control channel candidate of the second group of downlink control channel candidates two times. The operations of 910 may be performed in accordance with examples as disclosed herein. In some examples, aspects of the operations of 910 may be performed by a control channel candidate manager 730 as described with reference to FIG. 7.

At 915, the method may include monitoring for downlink control channel transmissions during the second TTI based on the counting of the BD limit of the second TTI. The operations of 915 may be performed in accordance with examples as disclosed herein. In some examples, aspects of the operations of 915 may be performed by a monitoring manager 740 as described with reference to FIG. 7.

Figure 10:
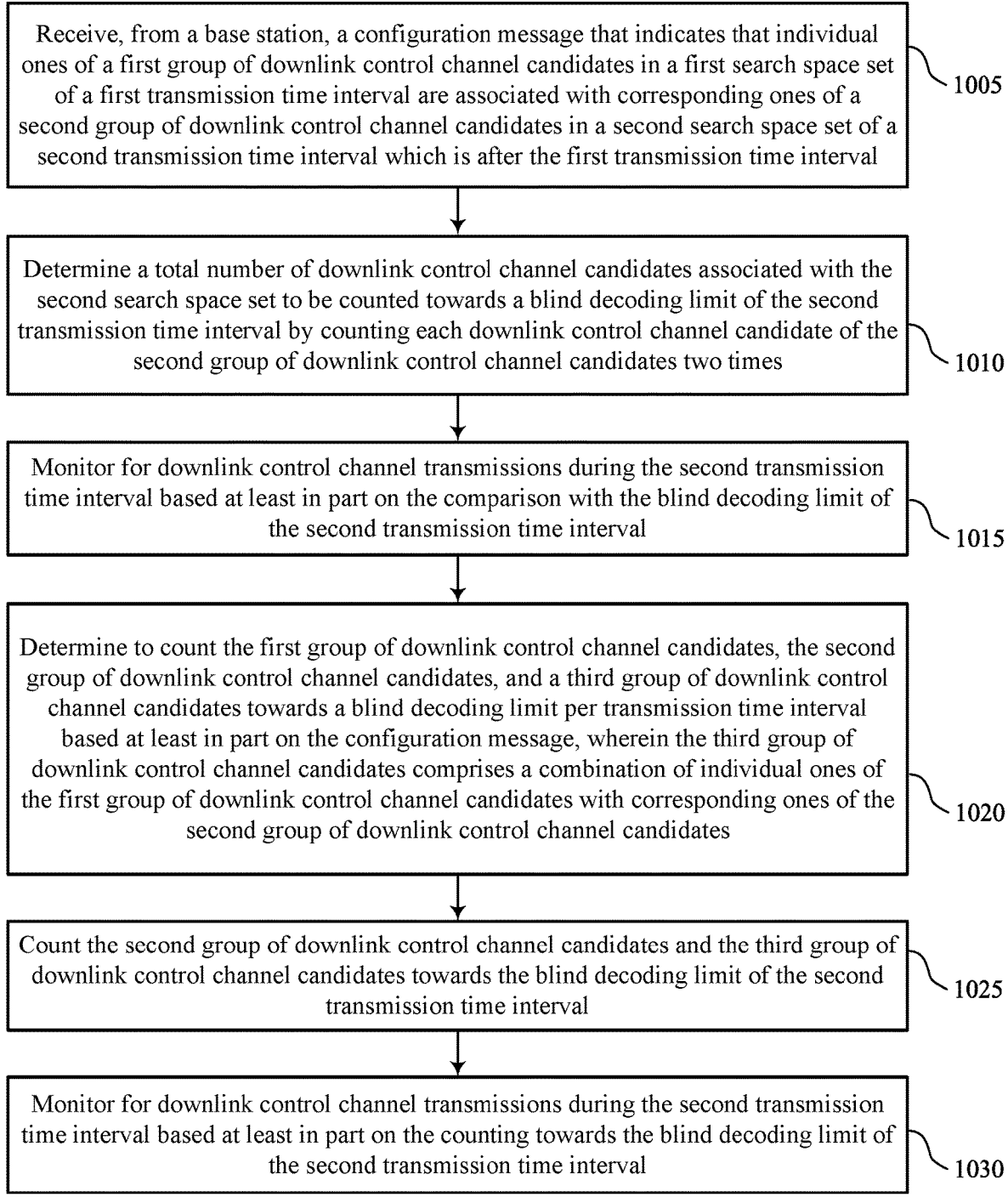

FIG. 10 shows a flowchart illustrating a method 1000 that supports BD limits and overbooking for PDCCH repetition in accordance with aspects of the present disclosure. The operations of the method 1000 may be implemented by a UE or its components as described herein. For example, the operations of the method 1000 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1005, the method may include receiving, from a base station, a configuration message that indicates that individual ones of a first group of downlink control channel candidates in a first SS set of a first TTI are associated with corresponding ones of a second group of downlink control channel candidates in a second SS set of a second TTI which is after the first TTI. The operations of 1005 may be performed in accordance with examples as disclosed herein. In some examples, aspects of the operations of 1005 may be performed by a configuration message manager 725 as described with reference to FIG. 7.

At 1010, the method may include determining a total number of downlink control channel candidates associated with the second SS set to be counted towards a BD limit of the second TTI by counting each downlink control channel candidate of the second group of downlink control channel candidates two times. The operations of 1010 may be performed in accordance with examples as disclosed herein. In some examples, aspects of the operations of 1010 may be performed by a control channel candidate manager 730 as described with reference to FIG. 7.

At 1015, the method may include monitoring for downlink control channel transmissions during the second TTI based on the counting of the BD limit of the second TTI. The operations of 1015 may be performed in accordance with examples as disclosed herein. In some examples, aspects of the operations of 1015 may be performed by a monitoring manager 740 as described with reference to FIG. 7.

At 1020, the method may include determining to count the first group of downlink control channel candidates, the second group of downlink control channel candidates, and a third group of downlink control channel candidates towards a BD limit per TTI based on the configuration message, wherein the third group of downlink control channel candidates comprises a combination of individual ones of the first group of downlink control channel candidates with corresponding ones of the second group of downlink control channel candidates, and monitoring for downlink control channel transmissions during the second TTI based on the counting of the BD limit of the second TTI. The operations of 1020 may be performed in accordance with examples as disclosed herein. In some examples, aspects of the operations of 1020 may be performed by a candidate counting manager 750 as described with reference to FIG. 7.

At 1025, the method may include counting the second group of downlink control channel candidates and the third group of downlink control channel candidates towards the BD limit of the second TTI. The operations of 1025 may be performed in accordance with examples as disclosed herein.

At 1030, the method may include monitoring for downlink control channel transmissions during the second TTI based on the counting towards the BD limit of the second TTI. The operations of 1030 may be performed in accordance with examples as disclosed herein. In some examples, aspects of the operations of 1030 may be performed by a monitoring manager 740 as described with reference to FIG. 7.

Figure 11:
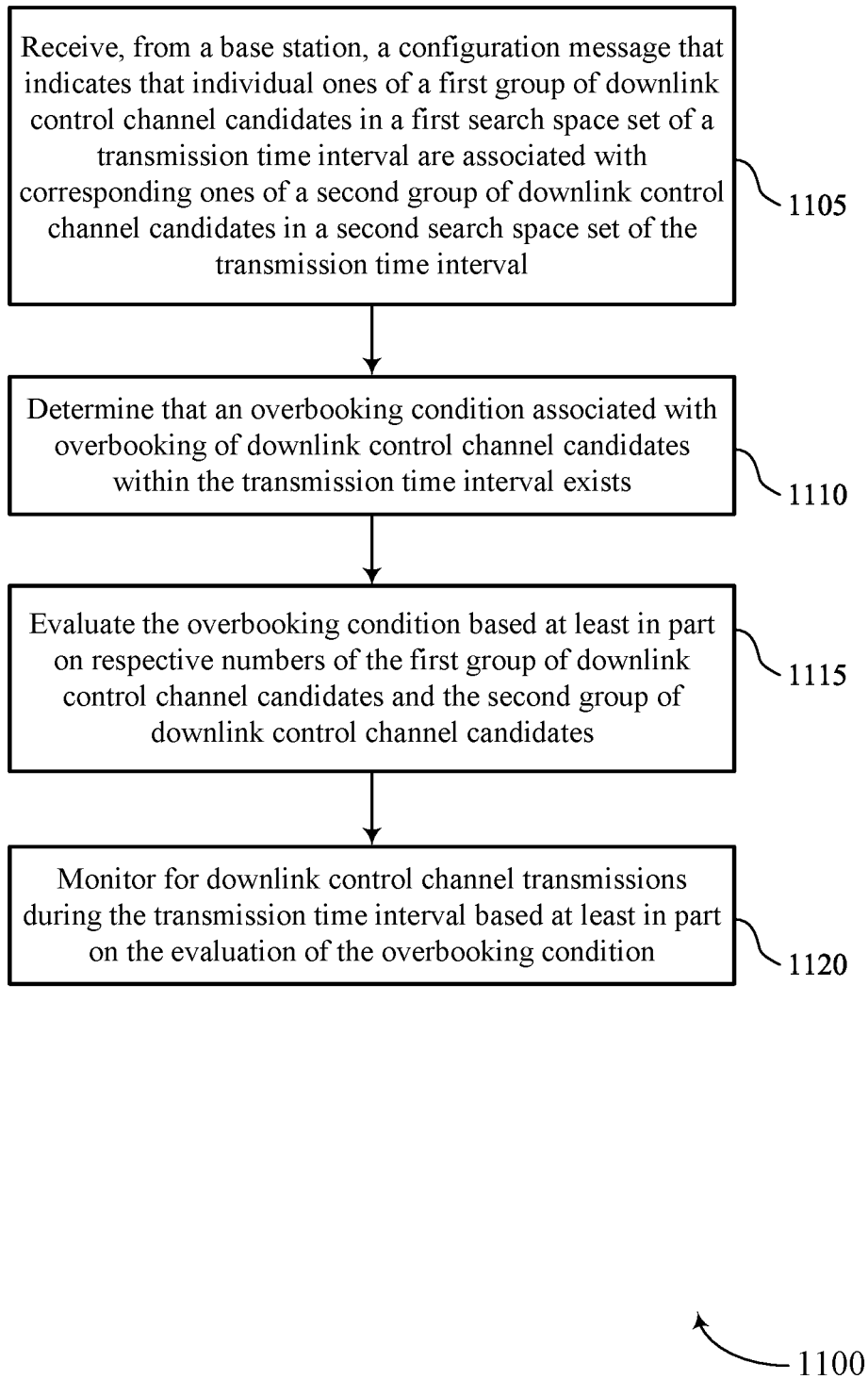

FIG. 11 shows a flowchart illustrating a method 1100 that supports BD limits and overbooking for PDCCH repetition in accordance with aspects of the present disclosure. The operations of the method 1100 may be implemented by a UE or its components as described herein. For example, the operations of the method 1100 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1105, the method may include receiving, from a base station, a configuration message that indicates that individual ones of a first group of downlink control channel candidates in a first SS set of a TTI are associated with corresponding ones of a second group of downlink control channel candidates in a second SS set of the TTI. The operations of 1105 may be performed in accordance with examples as disclosed herein. In some examples, aspects of the operations of 1105 may be performed by a configuration message manager 725 as described with reference to FIG. 7.

At 1110, the method may include determining that an overbooking condition associated with overbooking of downlink control channel candidates within the TTI exists. The operations of 1110 may be performed in accordance with examples as disclosed herein. In some examples, aspects of the operations of 1110 may be performed by an overbooking condition manager 745 as described with reference to FIG. 7.

At 1115, the method may include evaluating the overbooking condition based on respective numbers of the first group of downlink control channel candidates and the second group of downlink control channel candidates. The operations of 1115 may be performed in accordance with examples as disclosed herein. In some examples, aspects of the operations of 1115 may be performed by an overbooking condition manager 745 as described with reference to FIG. 7.

At 1120, the method may include monitoring for downlink control channel transmissions during the TTI based on the evaluation of the overbooking condition. The operations of 1120 may be performed in accordance with examples as disclosed herein. In some examples, aspects of the operations of 1120 may be performed by a monitoring manager 740 as described with reference to FIG. 7.

Aspect 1: A method for wireless communications at a UE, comprising: receiving, from a base station, a configuration message that indicates that individual ones of a first group of downlink control channel candidates in a first SS set of a first TTI are associated with corresponding ones of a second group of downlink control channel candidates in a second SS set of a second TTI which is after the first TTI; determining a total number of downlink control channel candidates associated with the second SS set to be counted towards a BD limit of the second TTI by counting each downlink control channel candidate of the second group of downlink control channel candidates two times.

Aspect 2: The method of aspect 1, further comprising: determining that an overbooking condition associated with overbooking of downlink control channel candidates within the second TTI exists; and evaluating the overbooking condition based at least in part on respective numbers of the second group of downlink control channel candidates and each combination of individual ones of the first group of downlink control channel candidates with corresponding ones of the second group of downlink control channel candidates, wherein the monitoring for downlink control channel transmissions is further based at least in part on the evaluation of the overbooking condition.

Aspect 3: The method of aspect 2, wherein evaluating the overbooking condition comprises: determining whether the overbooking condition is satisfied by evaluating the total number of downlink control channel candidates associated with the second SS set together.

Aspect 4: The method of any of aspects 2 through 3, wherein evaluating the overbooking condition comprises: determining whether the overbooking condition is satisfied by evaluating the second group of downlink control channel candidates separate from the combinations of individual ones of the first group of downlink control channel candidates with corresponding ones of the second group of downlink control channel candidates.

Aspect 5: The method of any of aspects 1 through 4, further comprising: determining to count the first group of downlink control channel candidates, the second group of downlink control channel candidates, and a third group of downlink control channel candidates towards a BD limit per TTI based at least in part on the configuration message, wherein the third group of downlink control channel candidates comprises a combination of individual ones of the first group of downlink control channel candidates with corresponding ones of the second group of downlink control channel candidates, and monitoring for downlink control channel transmissions during the second TTI based on the counting of the BD limit of the second TTI; counting the second group of downlink control channel candidates and the third group of downlink control channel candidates towards the BD limit of the second TTI; and monitoring for downlink control channel transmissions during the second TTI based at least in part on the counting towards the BD limit of the second TTI.

Aspect 6: The method of aspect, further comprising: determining that an overbooking condition associated with overbooking of downlink control channel candidates within the first TTI exists; and evaluating the overbooking condition based at least in part on respective numbers of the first group of downlink control channel candidates and each combination of individual ones of the first group of downlink control channel candidates with corresponding ones of the second group of downlink control channel candidates, wherein the monitoring for downlink control channel transmissions is further based at least in part on the evaluation of the overbooking condition.

Aspect 7: The method of aspect 6, wherein evaluating the overbooking condition comprises: determining whether the overbooking condition is satisfied by evaluating the total number of downlink control channel candidates associated with the first SS set together.

Aspect 8: The method of any of aspects 6 through 7, wherein evaluating the overbooking condition comprises: determining whether the overbooking condition is satisfied by evaluating the first group of downlink control channel candidates separate from the combinations of individual ones of the first group of downlink control channel candidates with corresponding ones of the second group of downlink control channel candidates.

Aspect 9: The method of any of aspects 1 through 8, wherein the second TTI comprises one of a time slot or a time span, and the first TTI comprises one of a time slot or a time span.

Aspect 10: The method of any of aspects 1 through 9, further comprising: receiving, from the base station, an instruction to count, towards the BD limit of the second TTI, a combination of individual ones of the first group of downlink control channel candidates with corresponding ones of the second group of downlink control channel candidates separately from a number of downlink control channel candidates in the second group of downlink control channel candidates, wherein determining the total number of downlink control channel candidates associated with the second SS set is based at least in part on the instruction.

Aspect 11: The method of any of aspects 1 through 10, wherein the other downlink control channel candidates associated with the second TTI correspond to a third SS set, or a UE-specific SS, or a common SS.

Aspect 12: A method for wireless communications at a UE, comprising: receiving, from a base station, a configuration message that indicates that individual ones of a first group of downlink control channel candidates in a first SS set of a TTI are associated with corresponding ones of a second group of downlink control channel candidates in a second SS set of the TTI; determining that an overbooking condition associated with overbooking of downlink control channel candidates within the TTI exists; evaluating the overbooking condition based at least in part on respective numbers of the first group of downlink control channel candidates and the second group of downlink control channel candidates; and monitoring for downlink control channel transmissions during the TTI based at least in part on the evaluation of the overbooking condition.

Aspect 13: The method of aspect 12, further comprising: comparing a first index value associated with the first SS set with a second index value associated with the second SS set; and determining whether the overbooking condition is satisfied by counting each downlink control channel candidate of the second group of downlink control channel candidates two times based at least in part on determining that the second index value associated with the second SS set is greater than the first index value associated with the first SS set.

Aspect 14: The method of aspect 12, wherein evaluating the overbooking condition comprises: determining whether the overbooking condition is satisfied by evaluating the number of the first group of downlink control channel candidates, the number of the second group of downlink control channel candidates, and each combination of individual ones of the first group of downlink control channel candidates with corresponding ones of the second group of downlink control channel candidates, together.

Aspect 15: The method of any of aspects 12 through 14, wherein evaluating the overbooking condition comprises: determining whether the overbooking condition is satisfied by evaluating the number of the first group of downlink control channel candidates or the second group of downlink control channel candidates, and a third group of downlink control channel candidates, wherein the third group comprises a combination of individual ones of the first group of downlink control channel candidates with corresponding ones of the second group of downlink control channel candidates.

Aspect 16: The method of aspect 15, further comprising: comparing a last monitoring occasion of the first SS set with a last monitoring occasion of the second SS set; determining that the last monitoring occasion of the first SS set is later in time than the last monitoring occasion of the second SS set; and determining whether to monitor the number of the first group of downlink control channel candidates, and each combination of individual ones of the first group of downlink control channel candidates with corresponding ones of the second group of downlink control channel candidates, based at least in part on determining that the last monitoring occasion of the first SS set is later in time than the last monitoring occasion of the second SS set.

Aspect 17: The method of any of aspects 15 through 16, further comprising: comparing a first index value associated with the first SS set with a second index value associated with the second SS set; and determining to monitor the number of the second group of downlink control channel candidates and the third group of downlink control channel candidates together based at least in part on determining that the second index value associated with the second SS set is greater than the first index value associated with the first SS set.

Aspect 18: The method of any of aspects 15 through 17, further comprising: comparing a first index value of a first control resource set associated with the first SS set with a second index of a second control resource set associated with the second SS set; and determining whether to the number of the first group of downlink control channel candidates, and each combination of individual ones of the first group of downlink control channel candidates with corresponding ones of the second group of downlink control channel candidates based at least in part on the comparing.

Aspect 19: The method of any of aspects 12 through 18, wherein evaluating the overbooking condition comprises: determining whether the overbooking condition is satisfied by evaluating the first group of downlink control channel candidates, the second group of downlink control channel candidates, and the combinations of individual ones of the first group of downlink control channel candidates with corresponding ones of the second group of downlink control channel candidates, separate from each other.

Aspect 20: The method of any of aspects 12 through 19, wherein the TTI comprises one of a time slot or a time span.

Aspect 21: An apparatus for wireless communications at a UE, comprising at least one processor; memory coupled to the at least one processor, the memory storing instructions executable by the at least one processor to cause the apparatus to perform a method of any of aspects 1 through 11.

Aspect 22: An apparatus for wireless communications at a UE, comprising at least one means for performing a method of any of aspects 1 through 11.

Aspect 23: A non-transitory computer-readable medium storing code for wireless communications at a UE, the code comprising instructions executable by a processor to perform a method of any of aspects 1 through 11.

Aspect 24: An apparatus for wireless communications at a UE, comprising at least one processor; memory coupled to the at least one processor, the memory storing instructions executable by the at least one processor to cause the apparatus to perform a method of any of aspects 12 through 20.

Aspect 25: An apparatus for wireless communications at a UE, comprising at least one means for performing a method of any of aspects 12 through 20.

Aspect 26: A non-transitory computer-readable medium storing code for wireless communications at a UE, the code comprising instructions executable by a processor to perform a method of any of aspects 12 through 20.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies, including future systems and radio technologies, not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, a GPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, or any combination thereof. Software shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, hardwiring, or combinations of any of these. Features implementing functions may also be physically located at various positions, including being distributed such that portions of functions are implemented at different physical locations. Software shall be construed broadly to mean instructions, instruction sets, code, code segments, program code, programs, subprograms, software modules, applications, software applications, software packages, routines, subroutines, objects, executables, threads of execution, procedures, or functions, whether referred to as software, middleware, microcode, hardware description language, or otherwise. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, phase change memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (e.g., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on." As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE), comprising:
   receiving, from a network device, a configuration message that indicates that individual ones of a first group of downlink control channel candidates in a first search space set of a first transmission time interval are associated with corresponding ones of a second group of downlink control channel candidates in a second search space set of a second transmission time interval which is after the first transmission time interval;
   determining a total number of downlink control channel candidates associated with the second search space set to be counted towards a blind decoding limit of the second transmission time interval by counting each downlink control channel candidate of the second group of downlink control channel candidates two times; and
   monitoring for downlink control channel transmissions during the second transmission time interval based at least in part on the counting.

2. The method of claim 1, further comprising:
   determining to count the first group of downlink control channel candidates, the second group of downlink control channel candidates, and a third group of downlink control channel candidates towards a blind decoding limit per transmission time interval based at least in part on the configuration message, wherein the third group of downlink control channel candidates comprises a combination of individual ones of the first group of downlink control channel candidates with corresponding ones of the second group of downlink control channel candidates;
   counting the second group of downlink control channel candidates and the third group of downlink control channel candidates towards the blind decoding limit of the second transmission time interval; and
   monitoring for downlink control channel transmissions during the second transmission time interval based at least in part on the counting towards the blind decoding limit of the second transmission time interval.

3. The method of claim 1, further comprising:
   determining that an overbooking condition associated with overbooking of downlink control channel candidates within the first transmission time interval exists; and
   evaluating the overbooking condition based at least in part on respective numbers of the first group of downlink control channel candidates and each combination of individual ones of the first group of downlink control channel candidates with corresponding ones of the second group of downlink control channel candidates, wherein the monitoring for downlink control channel transmissions is further based at least in part on the evaluation of the overbooking condition.

4. The method of claim 3, wherein evaluating the overbooking condition comprises:
   determining whether the overbooking condition is satisfied by evaluating the total number of downlink control channel candidates associated with the first search space set together.

5. The method of claim 3, wherein evaluating the overbooking condition comprises:
   determining whether the overbooking condition is satisfied by evaluating the first group of downlink control channel candidates separate from the combinations of individual ones of the first group of downlink control channel candidates with corresponding ones of the second group of downlink control channel candidates.

6. The method of claim 1, further comprising:
   determining that an overbooking condition associated with overbooking of downlink control channel candidates within the second transmission time interval exists; and
   evaluating the overbooking condition based at least in part on respective numbers of the second group of downlink control channel candidates and each combination of individual ones of the first group of downlink control channel candidates with corresponding ones of the second group of downlink control channel candidates, wherein the monitoring for downlink control channel transmissions is further based at least in part on the evaluation of the overbooking condition.

7. The method of claim 6, wherein evaluating the overbooking condition comprises:
determining whether the overbooking condition is satisfied by evaluating the total number of downlink control channel candidates associated with the second search space set together.

8. The method of claim 6, wherein evaluating the overbooking condition comprises:
determining whether the overbooking condition is satisfied by evaluating the second group of downlink control channel candidates separate from the combinations of individual ones of the first group of downlink control channel candidates with corresponding ones of the second group of downlink control channel candidates.

9. The method of claim 1, wherein:
the second transmission time interval comprises one of a time slot or a time span, and
the first transmission time interval comprises one of a time slot or a time span.

10. The method of claim 1, further comprising:
receiving, from the network device, an instruction to count, towards the blind decoding limit of the second transmission time interval, a combination of individual ones of the first group of downlink control channel candidates with corresponding ones of the second group of downlink control channel candidates separately from a number of downlink control channel candidates in the second group of downlink control channel candidates, wherein determining the total number of downlink control channel candidates associated with the second search space set is based at least in part on the instruction.

11. A method for wireless communications at a user equipment (UE), comprising:
receiving, from a network device, a configuration message that indicates that individual ones of a first group of downlink control channel candidates in a first search space set of a transmission time interval are associated with corresponding ones of a second group of downlink control channel candidates in a second search space set of the transmission time interval;
determining that an overbooking condition associated with overbooking of downlink control channel candidates within the transmission time interval exists;
evaluating the overbooking condition based at least in part on respective numbers of the first group of downlink control channel candidates and the second group of downlink control channel candidates; and
monitoring for downlink control channel transmissions during the transmission time interval based at least in part on the evaluation of the overbooking condition.

12. The method of claim 11, wherein evaluating the overbooking condition comprises:
comparing a first index value associated with the first search space set with a second index value associated with the second search space set; and
determining whether the overbooking condition is satisfied by counting each downlink control channel candidate of the second group of downlink control channel candidates two times based at least in part on determining that the second index value associated with the second search space set is greater than the first index value associated with the first search space set.

13. The method of claim 11, wherein evaluating the overbooking condition comprises:

determining whether the overbooking condition is satisfied by evaluating the number of the first group of downlink control channel candidates or the second group of downlink control channel candidates, and a third group of downlink control channel candidates, wherein the third group comprises a combination of individual ones of the first group of downlink control channel candidates with corresponding ones of the second group of downlink control channel candidates.

14. The method of claim 13, further comprising:
comparing a first index value associated with the first search space set with a second index value associated with the second search space set; and
determining to monitor the number of the second group of downlink control channel candidates and the third group of downlink control channel candidates together based at least in part on determining that the second index value associated with the second search space set is greater than the first index value associated with the first search space set.

15. The method of claim 13, further comprising:
comparing a last monitoring occasion of the first search space set with a last monitoring occasion of the second search space set;
determining that the last monitoring occasion of the first search space set is later in time than the last monitoring occasion of the second search space set; and
determining whether to monitor the number of the first group of downlink control channel candidates, and each combination of individual ones of the first group of downlink control channel candidates with corresponding ones of the second group of downlink control channel candidates, based at least in part on determining that the last monitoring occasion of the first search space set is later in time than the last monitoring occasion of the second search space set.

16. The method of claim 13, further comprising:
comparing a first index value of a first control resource set associated with the first search space set with a second index of a second control resource set associated with the second search space set; and
determining whether to the number of the first group of downlink control channel candidates, and each combination of individual ones of the first group of downlink control channel candidates with corresponding ones of the second group of downlink control channel candidates based at least in part on the comparing.

17. The method of claim 11, wherein evaluating the overbooking condition comprises:
determining whether the overbooking condition is satisfied by evaluating the number of the first group of downlink control channel candidates, the number of the second group of downlink control channel candidates, and each combination of individual ones of the first group of downlink control channel candidates with corresponding ones of the second group of downlink control channel candidates, together.

18. The method of claim 11, wherein evaluating the overbooking condition comprises:
determining whether the overbooking condition is satisfied by evaluating the first group of downlink control channel candidates, the second group of downlink control channel candidates, and a combination of individual ones of the first group of downlink control channel candidates with corresponding ones of the second group of downlink control channel candidates, separate from each other.

19. The method of claim 11, wherein the transmission time interval comprises one of a time slot or a time span.

20. An apparatus for wireless communications at a user equipment (UE), comprising:
at least one processor; and
memory coupled to the at least one processor, the memory storing instructions executable by the at least one processor to cause the apparatus to:
receive, from a network device, a configuration message that indicates that individual ones of a first group of downlink control channel candidates in a first search space set of a first transmission time interval are associated with corresponding ones of a second group of downlink control channel candidates in a second search space set of a second transmission time interval which is after the first transmission time interval;
determine a total number of downlink control channel candidates associated with the second search space set to be counted towards a blind decoding limit of the second transmission time interval by counting each downlink control channel candidate of the second group of downlink control channel candidates two times; and
monitor for downlink control channel transmissions during the second transmission time interval based at least in part on the counting.

21. The apparatus of claim 20, wherein the instructions are further executable by the at least one processor to cause the apparatus to:
determine to count the first group of downlink control channel candidates, the second group of downlink control channel candidates, and a third group of downlink control channel candidates towards a blind decoding limit per transmission time interval based at least in part on the configuration message, wherein the third group of downlink control channel candidates comprise a combination of individual ones of the first group of downlink control channel candidates with corresponding ones of the second group of downlink control channel candidates;
count the second group of downlink control channel candidates and the third group of downlink control channel candidates towards the blind decoding limit of the second transmission time interval; and
monitor for downlink control channel transmissions during the second transmission time interval based at least in part on the counting towards the blind decoding limit of the second transmission time interval.

22. The apparatus of claim 20, wherein the instructions are further executable by the at least one processor to cause the apparatus to:
determine that an overbooking condition associated with overbooking of downlink control channel candidates within the first transmission time interval exists; and
evaluate the overbooking condition based at least in part on respective numbers of the first group of downlink control channel candidates and each combination of individual ones of the first group of downlink control channel candidates with corresponding ones of the second group of downlink control channel candidates, wherein the monitoring for downlink control channel transmissions is further based at least in part on the evaluation of the overbooking condition.

23. The apparatus of claim 22, wherein the instructions to evaluate the overbooking condition are executable by the at least one processor to cause the apparatus to:
determine whether the overbooking condition is satisfied by evaluating the total number of downlink control channel candidates associated with the first search space set together.

24. The apparatus of claim 22, wherein the instructions to evaluate the overbooking condition are executable by the at least one processor to cause the apparatus to:
determine whether the overbooking condition is satisfied by evaluating the first group of downlink control channel candidates separate from the combinations of individual ones of the first group of downlink control channel candidates with corresponding ones of the second group of downlink control channel candidates.

25. The apparatus of claim 20, wherein the instructions are further executable by the at least one processor to cause the apparatus to:
determine that an overbooking condition associated with overbooking of downlink control channel candidates within the second transmission time interval exists; and
evaluate the overbooking condition based at least in part on respective numbers of the second group of downlink control channel candidates and each combination of individual ones of the first group of downlink control channel candidates with corresponding ones of the second group of downlink control channel candidates, wherein the monitoring for downlink control channel transmissions is further based at least in part on the evaluation of the overbooking condition.

26. The apparatus of claim 25, wherein the instructions to evaluate the overbooking condition are executable by the at least one processor to cause the apparatus to:
determine whether the overbooking condition is satisfied by evaluating the second group of downlink control channel candidates separate from the combinations of individual ones of the first group of downlink control channel candidates with corresponding ones of the second group of downlink control channel candidates.

27. The apparatus of claim 25, wherein the instructions to evaluate the overbooking condition are executable by the at least one processor to cause the apparatus to:
determine whether the overbooking condition is satisfied by evaluating the total number of downlink control channel candidates associated with the second search space set together.

28. The apparatus of claim 20, wherein:
the second transmission time interval comprises one of a time slot or a time span; and
the first transmission time interval comprises one of a time slot or a time span.

29. The apparatus of claim 20, wherein the instructions are further executable by the at least one processor to cause the apparatus to:
receive, from the network device, an instruction to count, towards the blind decoding limit of the second transmission time interval, a combination of individual ones of the first group of downlink control channel candidates with corresponding ones of the second group of downlink control channel candidates separately from a number of downlink control channel candidates in the second group of downlink control channel candidates, wherein determining the total number of downlink control channel candidates associated with the second search space set is based at least in part on the instruction.

30. An apparatus for wireless communications at a user equipment (UE), comprising:
at least one processor; and memory coupled to the at least one processor, the memory storing instructions executable by the at least one processor to cause the apparatus to:
  receive, from a network device, a configuration message that indicates that individual ones of a first group of downlink control channel candidates in a first search space set of a transmission time interval are associated with corresponding ones of a second group of downlink control channel candidates in a second search space set of the transmission time interval;
  determine that an overbooking condition associated with overbooking of downlink control channel candidates within the transmission time interval exists;
  evaluate the overbooking condition based at least in part on respective numbers of the first group of downlink control channel candidates and the second group of downlink control channel candidates; and
  monitor for downlink control channel transmissions during the transmission time interval based at least in part on the evaluation of the overbooking condition.

31. The apparatus of claim 30, wherein the instructions to evaluate the overbooking condition are executable by the at least one processor to cause the apparatus to:
  compare a first index value associated with the first search space set with a second index value associated with the second search space set; and
  determine whether the overbooking condition is satisfied by counting each downlink control channel candidate of the second group of downlink control channel candidates two times based at least in part on determining that the second index value associated with the second search space set is greater than the first index value associated with the first search space set.

32. The apparatus of claim 30, wherein the instructions to evaluate the overbooking condition are executable by the at least one processor to cause the apparatus to:
  determine whether the overbooking condition is satisfied by evaluating the number of the first group of downlink control channel candidates or the second group of downlink control channel candidates, and a third group of downlink control channel candidates, wherein the third group comprises a combination of individual ones of the first group of downlink control channel candidates with corresponding ones of the second group of downlink control channel candidates.

33. The apparatus of claim 32, wherein the instructions are further executable by the at least one processor to cause the apparatus to:
  compare a first index value associated with the first search space set with a second index value associated with the second search space set; and
  determine to monitor the number of the second group of downlink control channel candidates and the third group of downlink control channel candidates together based at least in part on determining that the second index value associated with the second search space set is greater than the first index value associated with the first search space set.

34. The apparatus of claim 32, wherein the instructions are further executable by the at least one processor to cause the apparatus to:
  compare a last monitoring occasion of the first search space set with a last monitoring occasion of the second search space set;
  determine that the last monitoring occasion of the first search space set is later in time than the last monitoring occasion of the second search space set; and
  determine whether to monitor the number of the first group of downlink control channel candidates, and each combination of individual ones of the first group of downlink control channel candidates with corresponding ones of the second group of downlink control channel candidates, based at least in part on determining that the last monitoring occasion of the first search space set is later in time than the last monitoring occasion of the second search space set.

35. The apparatus of claim 32, wherein the instructions are further executable by the at least one processor to cause the apparatus to:
  compare a first index value of a first control resource set associated with the first search space set with a second index of a second control resource set associated with the second search space set; and
  determine whether to the number of the first group of downlink control channel candidates, and each combination of individual ones of the first group of downlink control channel candidates with corresponding ones of the second group of downlink control channel candidates based at least in part on the comparing.

36. The apparatus of claim 30, wherein the instructions to evaluate the overbooking condition are executable by the at least one processor to cause the apparatus to:
  determine whether the overbooking condition is satisfied by evaluating the number of the first group of downlink control channel candidates, the number of the second group of downlink control channel candidates, and each combination of individual ones of the first group of downlink control channel candidates with corresponding ones of the second group of downlink control channel candidates, together.

37. The apparatus of claim 30, wherein the instructions to evaluate the overbooking condition are executable by the at least one processor to cause the apparatus to:
  determine whether the overbooking condition is satisfied by evaluating the first group of downlink control channel candidates, the second group of downlink control channel candidates, and a combination of individual ones of the first group of downlink control channel candidates with corresponding ones of the second group of downlink control channel candidates, separate from each other.

38. The apparatus of claim 30, wherein the transmission time interval comprises one of a time slot or a time span.

39. An apparatus for wireless communications at a user equipment (UE), comprising:
  means for receiving, from a network device, a configuration message that indicates that individual ones of a first group of downlink control channel candidates in a first search space set of a first transmission time interval are associated with corresponding ones of a second group of downlink control channel candidates in a second search space set of a second transmission time interval which is after the first transmission time interval;
  means for determining a total number of downlink control channel candidates associated with the second search space set to be counted towards a blind decoding limit of the second transmission time interval by counting each downlink control channel candidate of the second group of downlink control channel candidates two times; and means for monitoring for downlink control channel transmissions during the second transmission time interval based at least in part on the counting.

40. An apparatus for wireless communications at a user equipment (UE), comprising:
    means for receiving, from a network device, a configuration message that indicates that individual ones of a first group of downlink control channel candidates in a first search space set of a transmission time interval are associated with corresponding ones of a second group of downlink control channel candidates in a second search space set of the transmission time interval;
    means for determining that an overbooking condition associated with overbooking of downlink control channel candidates within the transmission time interval exists;
    means for evaluating the overbooking condition based at least in part on respective numbers of the first group of downlink control channel candidates and the second group of downlink control channel candidates; and
    means for monitoring for downlink control channel transmissions during the transmission time interval based at least in part on the evaluation of the overbooking condition.

41. A non-transitory computer-readable medium storing code for wireless communications at a user equipment (UE), the code comprising instructions executable by at least one processor to:
    receive, from a network device, a configuration message that indicates that individual ones of a first group of downlink control channel candidates in a first search space set of a first transmission time interval are associated with corresponding ones of a second group of downlink control channel candidates in a second search space set of a second transmission time interval which is after the first transmission time interval;
    determine a total number of downlink control channel candidates associated with the second search space set to be counted towards a blind decoding limit of the second transmission time interval by counting each downlink control channel candidate of the second group of downlink control channel candidates two times; and
    monitor for downlink control channel transmissions during the second transmission time interval based at least in part on the counting.

42. A non-transitory computer-readable medium storing code for wireless communications at a user equipment (UE), the code comprising instructions executable by at least one processor to:
    receive, from a network device, a configuration message that indicates that individual ones of a first group of downlink control channel candidates in a first search space set of a transmission time interval are associated with corresponding ones of a second group of downlink control channel candidates in a second search space set of the transmission time interval;
    determine that an overbooking condition associated with overbooking of downlink control channel candidates within the transmission time interval exists;
    evaluate the overbooking condition based at least in part on respective numbers of the first group of downlink control channel candidates and the second group of downlink control channel candidates; and
    monitor for downlink control channel transmissions during the transmission time interval based at least in part on the evaluation of the overbooking condition.

43. An apparatus for wireless communications at a user equipment (UE), comprising:
    a controller associated with a memory device, wherein the controller is configured to cause the apparatus to:
        receive, from a network device, a configuration message that indicates that individual ones of a first group of downlink control channel candidates in a first search space set of a first transmission time interval are associated with corresponding ones of a second group of downlink control channel candidates in a second search space set of a second transmission time interval which is after the first transmission time interval;
        determine a total number of downlink control channel candidates associated with the second search space set to be counted towards a blind decoding limit of the second transmission time interval by counting each downlink control channel candidate of the second group of downlink control channel candidates two times; and
        monitor for downlink control channel transmissions during the second transmission time interval based at least in part on the counting.

44. An apparatus for wireless communications at a user equipment (UE), comprising:
    a controller associated with a memory device, wherein the controller is configured to cause the apparatus to:
        receive, from a network device, a configuration message that indicates that individual ones of a first group of downlink control channel candidates in a first search space set of a transmission time interval are associated with corresponding ones of a second group of downlink control channel candidates in a second search space set of the transmission time interval;
        determine that an overbooking condition associated with overbooking of downlink control channel candidates within the transmission time interval exists;
        evaluate the overbooking condition based at least in part on respective numbers of the first group of downlink control channel candidates and the second group of downlink control channel candidates; and
        monitor for downlink control channel transmissions during the transmission time interval based at least in part on the evaluation of the overbooking condition.

* * * * *